(12) United States Patent
Swvigaradoss et al.

(10) Patent No.: US 11,727,213 B2
(45) Date of Patent: *Aug. 15, 2023

(54) AUTOMATIC CONVERSATION BOT GENERATION USING INPUT FORM

(71) Applicant: ServiceNow, Inc., Santa Clara, CA (US)

(72) Inventors: Jebakumar Mathuram Santhosm Swvigaradoss, Hyderabad (IN); Madhusudan Mathihalli, Saratoga, CA (US); Molugu Sainithin, Hyderabad (IN); Nidhi Garg, Sheopur (IN); Aman Jain, Sagar (IN); Sakshi Kataria, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/016,101

(22) Filed: Sep. 9, 2020

(65) Prior Publication Data
US 2022/0075947 A1    Mar. 10, 2022

(51) Int. Cl.
*G06F 40/289* (2020.01)
*H04L 51/02* (2022.01)

(52) U.S. Cl.
CPC ............ *G06F 40/289* (2020.01); *H04L 51/02* (2013.01)

(58) Field of Classification Search
CPC ............ G06F 40/174; G06F 16/24578; G06F 16/258; G06F 16/3347; G06F 16/353; G06F 16/5846; G06F 16/93; G06F 40/12; G06F 40/284; G06F 40/30; G06F 40/289; G06K 9/00449; G06K 9/00442; G06K 9/00456; G06K 9/00463; G06K 9/00469; G06K 9/2054; G06K 9/72; H04L 51/02
See application file for complete search history.

(56) References Cited

U.S. PATENT DOCUMENTS

| | | | | |
|---|---|---|---|---|
| 6,088,700 | A * | 7/2000 | Larsen | G06F 40/174 715/239 |
| 8,832,546 | B2 * | 9/2014 | Begole | G06F 40/174 715/226 |
| 9,262,393 | B2 * | 2/2016 | Naderi | G06F 40/174 |
| 10,614,424 | B1 * | 4/2020 | Malinowski | G06Q 10/1095 |
| 2005/0289114 | A1 * | 12/2005 | Bellamy | G06F 16/2428 |
| 2007/0234224 | A1 * | 10/2007 | Leavitt | G06F 1/1626 715/765 |
| 2008/0195931 | A1 * | 8/2008 | Raghupathy | G06V 30/32 715/230 |
| 2012/0026081 | A1 * | 2/2012 | Kompalli | G06F 3/0304 345/156 |
| 2013/0205189 | A1 * | 8/2013 | DiPierro | G06F 40/174 715/224 |
| 2017/0046622 | A1 * | 2/2017 | Gaither | G06F 40/247 |

(Continued)

*Primary Examiner* — Wilson W Tsui
(74) *Attorney, Agent, or Firm* — Van Pelt, Yi & James LLP

(57) ABSTRACT

An input document data is received. The input document data is analyzed to automatically identify one or more response fields and one or more corresponding text labels laid out in the input document data. A conversation bot is automatically configured to provide one or more requests to provide one or more responses corresponding to the one or more response fields, receive the one or more responses, and store the one or more responses in a persistent computer storage.

20 Claims, 18 Drawing Sheets

(56) References Cited

U.S. PATENT DOCUMENTS

2017/0075873 A1* 3/2017 Shetty ................... G06F 40/174
2018/0033147 A1* 2/2018 Becker ................. G06V 10/768
2019/0036853 A1* 1/2019 Denoue ................ G06F 40/174

* cited by examiner

FIG. 6

| Label | Type | Mandatory? | Reference | Include Column |
|---|---|---|---|---|
| Name of Post (Applying For) | text | ◀ 0 ▶ | | ☑ |
| Name of Candidate | text | ◀ 0 ▶ | | ☑ |
| Gender | reference | ◀ 0 ▶ | gender_218_list ◀ ▶ | ☑ |
| Father's or Husband Name | text | ◀ 0 ▶ | | ☑ |
| PHOTO | reference | ◀ 0 ▶ | sys_attachment ◀ ▶ | ☑ |
| Date of Birth | date | ◀ 0 ▶ | | ☑ |
| District Domicile | text | ◀ 0 ▶ | | ☑ |
| Urban | reference | ◀ 0 ▶ | none ◀ ▶ | ☑ |
| Rural | reference | ◀ 0 ▶ | none ◀ ▶ | ☑ |
| CNIC No | text | ◀ 0 ▶ | | ☑ |
| Contact No | text | ◀ 0 ▶ | | ☑ |
| Religion | text | ◀ 0 ▶ | | ☑ |

FIG. 7

Table Name: Educational Qualification Table 2020s

Found 5 existing table(s) with the same information

| Label | Type | Mandatory? | Reference | Include Column |
|---|---|---|---|---|
| S. No | text | ◀ ▶ ○ ◀ ▶ | | ☑ |
| Name of Degree | text | ◀ ▶ ○ ◀ ▶ | | ☑ |
| Year of Passing | text | ◀ ▶ ○ ◀ ▶ | | ☑ |
| Board or University | text | ◀ ▶ ○ ◀ ▶ | | ☑ |
| Grade or Division or CGPA | text | ◀ ▶ ○ ◀ ▶ | | ☑ |
| Specialization (If Any) | text | ◀ ▶ ○ ◀ ▶ | | ☑ |

| Label | Type | Mandatory? | Reference | Include in Agent | Include Column |
|---|---|---|---|---|---|
| Name | text | 1 | | ✓ | ☑ |
| Email | text | 0 | | ☑ | ☑ |
| Phone | text | 0 | | ☐ | ☑ |
| Airline | reference | 1 | u_airline | ✓ | ☑ |
| Destination | text | 0 | | ☑ | ☑ |
| Leave Date | date | 0 | | ☑ | ☑ |
| Return Date | date | 0 | | ☐ | ☑ |
| Estimated Cost | text | 0 | | ☐ | ☑ |
| Payment Method | reference | 0 | u_payment_method | ☑ | ☑ |
| Purpose of Travel | text | 0 | | ☐ | ☑ |

AUTOMATIC CONVERSATION BOT GENERATION USING INPUT FORM

BACKGROUND OF THE INVENTION

Analyzing user collected data across different user response forms is a complex technical challenge and can quickly become difficult if not impossible. Traditionally, users are provided with a form document and user data is tediously collected from user responses. The user data can be collected from a vast number of different users using a wide variety of different forms, each potentially including both different and similar questions. Moreover, even when questions are similar, different users can respond with answers in vastly different formats, especially when presented with different forms such as an employment form and job history form. It is a technical challenge to not only collect user responses but to also relate the collected user responses from different users when submitted via different forms. Therefore, there is a need to collect responses to custom forms from users in an efficient manner for analysis.

BRIEF DESCRIPTION OF THE DRAWINGS

Various embodiments of the invention are disclosed in the following detailed description and the accompanying drawings.

FIG. 6 is a diagram illustrating an example of a physical form document.

FIG. 7 is a diagram illustrating an embodiment of an administrator user interface for creating a digital form.

FIG. 8 is a diagram illustrating an embodiment of an administrator user interface for creating a table in a digital form.

FIGS. 9A and 9B are diagrams illustrating an embodiment of a user interface for a computer form application.

FIG. 10 is a diagram illustrating an example of an annotated physical form document.

FIG. 11 is a diagram illustrating an embodiment of an administrator user interface for generating a conversation bot.

FIG. 16 is a diagram illustrating an embodiment of a user interface for an automatically generated computer form application.

DETAILED DESCRIPTION

Figure 1:
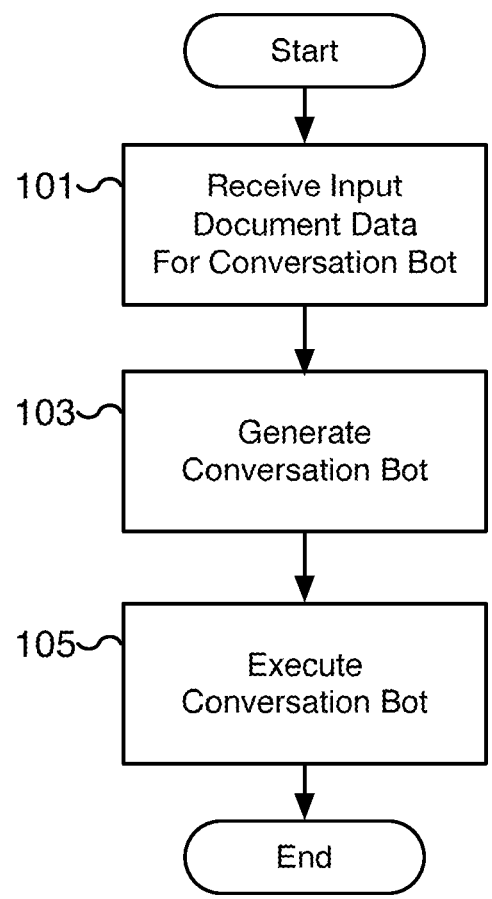
FIG. 1 is a flow chart illustrating an embodiment of a process for automating the collection of form data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for automatically generating a conversation bot using an input document form is disclosed. Using a conversation bot, the requests of the input form document can be provided to a user via a chat interface. User responses to the requests can be captured to complete the corresponding response fields of the form. The original input document form is used to automatically generate and configure the conversation bot. The form document is analyzed to configure the conversation bot to ask a series of requests directed to collect user responses. The responses can be validated to ensure that the responses conform to the response field requirements. For example, a date entered for a date of birth can be enforced to be an actual valid date with a corresponding appropriate age instead of a free form response or a date with an invalid corresponding age. As another example, some response fields have limited valid responses, such as the name of an airline for a request for flight information. The configured conversation bot can provide all valid responses to the user and receive as user input one of the valid responses. The ability to validate responses enforces compatibility of the responses across users and also across different forms. By enforcing compatibility across users and different custom forms, the responses to the automatically configured conversation bot can be correlated. This correlation allows relationships between the responses to be enforced as well as analyzed.

The consistency and quality of the user data is significantly improved in part because the form responses allow cross-referencing responses from different forms. For example, an employment form and job history form are different forms but can ask for overlapping information. Both forms may include requests for former employer information. An employment form may ask for a former employer's contact information but a job history form may additionally ask for information relating to a former immediate supervisor. Both forms may ask for a previous job title. A first form may ask for the user's level of seniority while a second form may ask for years of experience. Although requests for the user's former employer information are similar, the responses can be very different. For example, experience can be expressed using a variety of different descriptions such as job title experience (e.g., intern software engineer, junior software engineer, senior software engineer, etc.), years of experience (e.g., less than 1 year, between 2-3 years, 4-6 years, 7+ years, etc.), job ranking (software engineer 1, software engineer 2, software engineer 3, etc.), or a number of other metrics.

The disclosed invention allows enforcement of compatibility across different forms in part by identifying relationships between form responses from different forms. For example, both an employment form and job history form may require job experience responses use the same response format. In various embodiments, responses to potentially unrelated standard and/or custom forms are captured using a configurable conversation bot. The responses across the different forms can be cross-referenced. For example, corresponding response fields from different forms are automatically generated to reference the same data store. Moreover, a data type is determined for each response field. For example, instead of allowing free form responses, a job experience response field may be populated with approved responses from which to select from. As another example, a response field for a date of birth is restricted to a date response with a valid corresponding age. Using the disclosed techniques, a conversation bot is automatically configured and generated to allow a user to complete the response fields of a form using a conversation bot by providing responses that match the expected response data type. The types of responses different users can provide are restricted to match the data types of the response fields. Valid responses from the different standard and/or custom forms are collected and stored in a shared persistence storage. In various embodiments, the process allows for user collection from diverse requests while enforcing responses to specific formats compatible across different forms. In some embodiments, the process further allows an administrator to customize each form by adding/removing response fields and by selecting a relationship to an existing data store, such as a database table, for response fields. An administrator can also configure one or more trigger phrases that when used by a user of the conversation bot initiate a conversation with the conversation bot to complete the requested form.

In various embodiments, a conversation bot initiates the collection of form data using a trigger phrase associated with a form. For example, each document form can be configured with one or more trigger phrases that when mentioned to a conversation bot trigger providing requests and collecting responses for the appropriate form. As one example, in some embodiments, a user can trigger completing a travel reimbursement form configured with the trigger phrase "travel reimbursement form" by typing a phrase that includes the trigger phrase, such as "complete travel reimbursement form," in a chat window with the conversation bot. Additional trigger phrases and/or variations of the trigger phrase can similarly trigger providing the user with a conversation bot version of the input document form for collecting user responses. Other manners of interacting with the conversation bot are appropriate as well. For example, in some embodiments, the trigger phrase is spoken instead of typed and responses are spoken and/or utilize a touch or gesture interface instead of a keyboard.

Typically, users enter data into standard and/or customized physical or digital forms. Standard forms can include government published forms such as employment forms, income tax forms, and benefits forms, among others. Different types of data collection forms including different types of customized forms can include employment forms, surveys, expense reports, and resumes, among others. Moreover, different variations of each type of form are typically required. For example, one expense report may require different fields compared to another. Often data collection forms need to be customized for a particular use case and new customized forms need to be created when new use cases arise. Traditionally, this data collection is done manually by entering the data by hand or in some cases by creating a custom application for online or digital data collection. Both methods are time consuming, tedious, and can be prone to error. Moreover, the different forms and their responses are not correlated.

Starting with a physical or digital form, a conversation bot is automatically generated and configured that allows users to complete a digital version of the form using the interactive format of a conversation bot. Users are provided with the automatically generated requests from the conversation bot and their input responses are collected as the form data. In some embodiments, the document data of the original form is analyzed, for example, by first digitizing a paper form and then analyzing the input document data for text labels and corresponding response fields. The identified text labels and response fields are used to automatically generate and configure the conversation bot. In some embodiments, the response fields are first mapped to existing data storage entries, such as one or more existing database tables and fields. For example, potential matches for a response field are shown to an administrator who selects the correct database table and/or field to match a response field to. In some embodiments, a data type is automatically determined for a response field. For example, a response field may be a text string, an integer, a floating point number, a date, a category, a name, a zip code, or another determined data type. In some embodiments, the administrator is presented with an automatically generated view with the identified response fields. The administrator can add and/or remove response fields and modify the data types of the fields. Once the fields are verified by the administrator, a conversation bot that allows a user to complete a digital conversation bot version of the form is automatically generated and/or configured. In some embodiments, only mandatory fields are initially included in the conversation bot version of the form and the administrator can optionally add additional fields to the conversation bot version of the form. In some embodiments, the conversation bot is a web application accessible via a web browser. For example, a conversation bot web application is automatically generated and a corresponding URL for the generated application is provided to users to access the conversation bot. In some embodiments, the conversation bot application is a desktop or mobile application and/or may use a conversation bot platform. In various embodiments, a user can input user data into the automatically generated and configured conversation bot application. The received input is captured and stored in a persistent computer data store. For example, the received input can be written to cloud-hosted data storage as one or more entries in a corresponding database table. In some embodiments, the disclosed conversation bot is a chat assistant, virtual assistant, agent, virtual agent, conversation agent, chat bot, messaging agent, and/or another similar interactive virtual agent.

In some embodiments, a method comprises receiving an input document data. For example, a physical form such as a paper form is digitized. The paper form includes text labels describing fields for users to complete. For example, a name label can have a corresponding blank response field for a user's first, middle, and last name and a date of birth label can have a corresponding response field for a user's month, day, and year of birth. A digitized version of the blank form is provided as the input document data. For example, the paper form can be scanned or a photo can be taken of the paper form. In some embodiments, the paper form is a hand drawn form. The input document data is analyzed to automatically identify one or more response fields and one or more corresponding text labels laid out in the input document data. For example, text labels in the scanned form are identified along with their corresponding response fields. As one example, a text label for a user's name is matched with an identified name response field. As another example, a date of birth text label is identified and matched with an identified date of birth response field. In some embodiments, the data types associated with the identified labels and fields are determined. For example, a name is a name data type that can include a first, middle, and last name. As another example, a date data type can include month, day, and year components. In various embodiments, the identified response fields can be matched with existing fields, such as existing fields in a preexisting database. For example, a country label and response field can match a previously populated database table with recognized countries. Each row of the preexisting database table can be populated with an existing country name.

In some embodiments, a conversation bot is automatically configured to provide one or more requests. For example, requests corresponding to text labels with associated response fields of the input document data are provided to a user of the conversation bot. The requests are provided for the user to provide one or more responses corresponding to the one or more response fields. For example, an "Enter: First Name" request is provided to prompt the user to enter their first name for completing a first name response field. Similarly, an "Enter: Date of Birth" request is provided to prompt the user to enter their date of birth for completing a date of birth response field. The user's responses are prompted by the provided requests and correspond to the response fields of the digitized form document. In various embodiments, one or more responses are received via the conversation bot and the one or more received responses from the users to the provided requests are stored in a persistent computer storage. For example, the user inputted responses are saved in a persistent database such as a cloud-hosted persistent data storage. In some embodiments, each response field corresponds to an entry in a database table.

In some embodiments, the form of the input document data is annotated. For example, a user can annotate a new or existing form to provide configuration settings and/or information associated with the input document data. In some embodiments, one type of annotation can indicate that a response field is mandatory. For example, an asterisk (or another appropriate) annotation next to the response field or corresponding text label can indicate that the field is a mandatory field that the user must supply a response for. As another example, different types of annotations can indicate different data types and/or user interface dialogs to associate with the response field. For example, a date or calendar annotation can indicate that the response field is a date and/or to provide to the user a date selection dialog for inputting and collecting the user's response. As another example, a table annotation can indicate that the response field is a reference data type and/or to provide to the user a reference value selection dialog for inputting and collecting the user's response. In various embodiments, a reference data type can reference values associated with a different database table, such as a list of valid airlines when inputting airline flight information or a payment method when inputting a method of payment. A reference value selection dialog can include displaying all, popular, most recently used, or another selection of valid values based on a different metric for the response field. As another example, a reference value selection dialog can include an auto complete feature to complete a partial response using only valid responses as options for completing the response. In various embodiments, the annotations provide the conversation bot with additional information to improve the accuracy of responses to the form.

FIG. 1 is a flow chart illustrating an embodiment of a process for automating the collection of form data. For example, starting with a form document, a conversation bot is configured and generated to collect user responses corresponding to the response fields of the form document. The collected responses can be stored in a persistent data storage and can reference existing data stores such as existing remote databases to leverage existing data relationships. Instead of requiring manual data entry, using the process of FIG. 1, a user can interact with a conversation bot to complete a form. Moreover, the conversation bot is automatically configured using an input document data to provide the proper requests and validate the corresponding responses.

At 101, an input document data for a conversation bot is received. For example, a digitized version of a form document is received. In some embodiments, the digitized version is a scanned version or a photo taken of a paper form or a pdf version or similar format of a digital form document. In some embodiments, the original form is hard drawn, for example, on paper or another surface such as a whiteboard. In some embodiments, the input document data is based on a digital image of a form document created using a computer application. An image of the form document can be recreated using a graphics image editor and/or may be drawn with a pen tablet or similar hardware. The digital form input document data may be a screenshot of a diagram created using an application such as Microsoft Word, Microsoft PowerPoint, and/or any mockup/wireframe tool. The input document data may include multiple pages corresponding to multiple pages of a form document. In some embodiments, the input document data corresponds to a digital image of each form document page. In some embodiments, the input document data is received in part by having an administrator or similar user upload the input document data to a hardware server.

In various embodiments, the input document data can include annotations associated with the response fields. For example, a user can add annotations to an existing form document to specify additional configuration settings for the digital form and conversation bot. In some embodiments, the annotations can be used to mark which response fields are mandatory and which are optional. For example, an asterisk can be used as a mandatory field annotation to configure a mandatory field setting. Annotations can also be used to limit or configure the data type of the response. For example, a data type annotation can identify a response field as a particular data type, such as a date data type. As another example, a reference data type annotation can identify a response field as a reference data type corresponding to a database table. In various embodiments, different unique annotations can be used to identify different supported data types including numbers, strings, names, addresses, currency, etc. In some embodiments, the annotations can also be used to specify the type of user interface elements to use for collecting the responses. For example, a date annotation can indicate a date selector should be used for collecting a date response. As another example, a reference type or reference value user selection dialog can be used for collecting a reference data type. An example reference type user selection dialog can display all valid values for the reference type and allow a user to easily select one of the valid choices.

At 103, a conversation bot is generated. Using the input document data received at 101, a conversation bot is configured and generated that allows users to digitally enter data corresponding to response fields of a form document. The input document data is analyzed to identify labels and corresponding response fields. Examples of response fields and their corresponding labels include fields and labels to collect a name, date of birth, date, address, job title, etc. The response fields can be automatically associated with a particular data type, such as a text string, a number, a positive number, a Boolean, a date, a date of birth, a currency amount, an address, etc. In various embodiments, different types of data types can be supported and can include very specific and customized data types. For example, a bank account type field may be limited to an approved list of account types such as checking and savings accounts. Although additional account types can be added or removed, the data type enforces that the value for the response field must be from the approved list of bank accounts.

In some embodiments, the identified fields and labels are mapped to existing data and data types. For example, a country field can be mapped to an existing country data type with possible country values. The mapping may be based on mapping the identified fields and labels to existing data such as existing database tables and/or database table fields. For example, a country text label and response field can be mapped to a country database table where each row of the table includes a name of a different country as a text string. In some embodiments, default response fields are configured for the conversation bot based on mandatory field settings associated with response fields. The mandatory field settings can be indicated by mandatory field annotations. Although mappings can be determined automatically, an administrator can also provide input to select the appropriate mapping. For example, an administrator selects from potential matches that are automatically identified. In some embodiments, before the conversation bot is generated, an administrator can modify the form analysis results, for example, by adding and/or removing response fields and/or mapping fields to existing sources and/or data types. In various embodiments, one or more trigger phrases are configured for the conversation bot to initiate the process of completing the corresponding form. Along with other properties of the conversation bot, an administrator can modify the trigger phrases.

Once the response fields have been verified and the trigger phrase(s) are configured, a custom conversation bot is generated that includes the selected response fields. The generated conversation bot can initiate collection of the response fields of the form, provide request prompts to guide a user during the collection process, and perform validation of the user's responses. In some embodiments, a backing data store, such as a backend database with corresponding database tables, is created for storing responses to the response fields. For example, a database schema or similar definition for organizing responses to the response fields is generated along with any additional table metadata. The schema can be used to initialize the data storage for storing responses collected via the conversation bot.

In some embodiments, the conversation bot generated is a web application and/or web service. Users can access the generated conversation bot via a provided URL to access the digitized form and submit user data responses for collection via the conversation bot. Once user data responses are collected using the conversation bot, the user data can be stored in a persistent computer storage, such as a database. In some embodiments, the generated conversation bot utilizes a different platform, such as a desktop device, a kiosk, a mobile device, or another appropriate platform.

At 105, the conversation bot is executed. For example, database tables corresponding to form response fields are created and the conversation bot is launched. In some embodiments, the conversation bot is run on a remote accessible server such as a web and/or application server and is accessible via a network connection. In various embodiments, the conversation bot is accessible by users via a web browser using a location identifier that may include at least a URL that incorporates the conversation bot. Once users access the conversation bot, they are presented with a chat interface for inputting form responses based on request prompts. Users can enter input responses via the conversation bot in response to requests for the requested fields of a digital form. The results are captured and stored in a persistent computer storage such as a network accessible database and/or data storage. The results stored at the persistent computer storage can be retrieved and/or analyzed as needed.

In some embodiments, the conversation bot is an ongoing service that may already be executing when a new digital form is created. A running conversation bot can be updated to include additional conversation bot configurations generated at 103 to support accessing new digital forms via the generated conversation bot. For example, a trigger phrase associated with an input document data initiates the completion of the corresponding form. In this manner, different forms can be accessible from the same conversation bot, for example, by utilizing different trigger phrases. In various embodiments, as new forms are analyzed, a conversation bot is configured to include the new document form without requiring the conversation bot to be restarted. For example, a new form can be dynamically added to the conversation bot and can be triggered using a corresponding trigger phrase or another appropriate technique.

Figure 2:
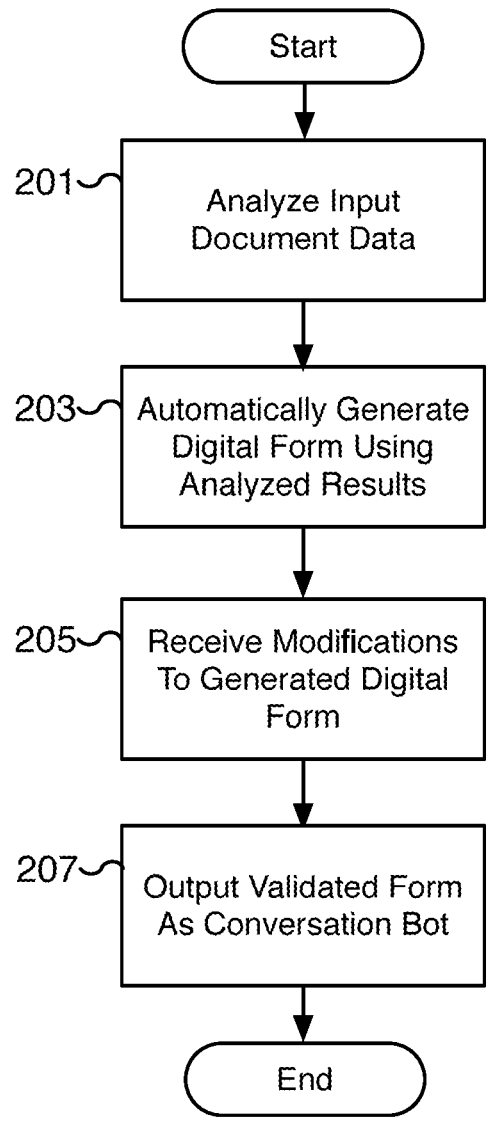
FIG. 2 is a flow chart illustrating an embodiment of a process for automatically generating a conversation bot using an input form document.

FIG. 2 is a flow chart illustrating an embodiment of a process for automatically generating a conversation bot using an input form document. For example, a form document is converted into a digitized form accessible via a conversation bot. The conversation bot provides requests as prompts and in turn the user provides responses corresponding to response fields of the input form document. The conversation bot's chat user interface significantly improves the workflow for the collection of user data. In particular, the workflow for collecting user data with custom forms is significantly more efficient at least in part by utilizing digital user data collection with a conversation bot that is automatically generated. In various embodiments, the conversation bot is generated using input document data. For example, the input document data may be a digital version of a physical form. In some embodiments, the process of FIG. 2 is performed at 103 of FIG. 1.

At 201, an input document data is analyzed. For example, the input document data is analyzed to automatically identify one or more response fields and one or more corresponding text labels laid out in the input document data. Example fields and response fields can include a name, address, education, date of birth, age, etc. Because the forms are often customized, the number and type of response fields and corresponding text labels can vary significantly. In some embodiments, data not corresponding to response fields is also identified. For example, document title, sub-titles, headers, footers, images, photos, etc. can be automatically identified. The identified non-response field data can be used in the generation and configuration of the conversation bot. For example, a form title can be identified from the input document data and used as a default trigger phrase to initiate filling out the form using the conversation bot. In some embodiments, annotations made to the form are also identified and used in configuring the conversation bot. For example, annotations made to the form can be used for determining data types, configuring user interfaces for collecting responses, and for other configuration settings. In some embodiments, mandatory fields are identified. For example, a mandatory field setting annotation is identified in the input document data and used to configure the mandatory response fields that will be included in the conversation bot by default.

In some embodiments, a data type is determined for each identified response field. For example, a name field may be configured to accept a string data type, an age field may be configured to accept a positive integer data type, a date of birth field may be configured to accept a date data type, etc. The data types supported can vary and can be customized as appropriate. In some embodiments, the data type can be determined based on an annotation identified in the form. For example, a date (or calendar) annotation can identify a response field as a date data type. As another example, a reference (or table) annotation can identify a response field as a reference data type. In some embodiments, a reference data type maps its values to values of an existing database table. For example, a response field can be mapped to existing data, such as an existing database table. As one example, a university response field can be mapped to a university table that includes data related to different universities and their names. The table can also contain additional university data such as location, address, contact information, etc. for each university entry that may not be requested by the response field or form. In some embodiments, existing data sources are searched using at least in part the corresponding text label of the response field.

In some embodiments, a group of identified response fields are mapped to a database table. As one example, a particular form can include a section with multiple blank entries to allow a user to submit the user's job experience from multiple different jobs. Each blank entry can include a response field for the name of an employer, a designation (or job title), an employer address, and a length of experience. In various embodiments, the job experience section of the form is analyzed and mapped to a job experience table that includes the relevant fields for employer name, designation, address, and total experience.

At 203, a digital form is automatically generated using the analyzed results. For example, a sample digital form is generated using the identified response fields and text labels. In some embodiments, each response field of the digital form has a data type. The response fields in the form may also be linked to existing data sources. For example, a university table and/or field of a university table can be linked to a university response field. In some embodiments, users submitting a response to the university response field must select an existing university name that exists in the university table. In some embodiments, multiple potential data references are identified, and the generated digital form includes options to select a source from the potential data references. In some embodiments, a default reference is selected but can be modified at step 205.

At 205, modifications to the generated digital form are received. For example, an administrator reviews and modifies the automatically generated digital form. In the event the administrator wants to make revisions, the administrator can modify the generated digital form to configure the conversation bot. In some embodiments, modifications include adding and/or removing response fields, adding and/or removing the response fields to include in the conversation bot, changing text labels, changing data types associated with response fields, changing the mapping of response fields to existing data stores, changing the form title, and/or adding/modifying trigger phrases to initiate the form completion, among others. For example, in some embodiments, only mandatory response fields are included in the conversation bot. An administrator can choose to include additional response fields from the identified fields in the conversation bot. As another example, in some embodiments, a trigger phrase is used by the user to initiate the completion of the digital form. For example, a user may type: "fill travel request" to trigger a form titled "Travel Authorization Form A1 65521." The phrase "travel form" can be associated with a particular form Travel Authorization Form A1 65521. In the event there are multiple travel forms, the phrase "travel form" may be associated with multiple forms and the user is provided with the different form options. In various embodiments, a single form can have multiple different trigger phrases. A default trigger phrase can be based on the title of the form as identified at 201 and/or modified at 205. In various embodiments, multiple forms can have the same and/or overlapping trigger phrases. In the event a user triggers multiple forms with the same phrase, the conversation bot can provide all matching forms for the user to select from. A match for a trigger phrase can be based on partial matching, full matching, matching based on context, and/or other appropriate techniques.

In some embodiments, at step 205, an administrator can configure a user selection dialog for one or more different response fields. For example, a particular user selection dialog can be used to collect a response for a response field that helps to ensure that the user response is valid. In some embodiments, the user selection dialog is based on the data type of the response field, an identified annotation associated with the response field, and/or an administrator configured selection. For example, a default selection dialog can be based on the data type of the response field. The default selection dialog can be overridden by an annotation, which in turn can be overridden by an administrator selection. Examples of user selection dialogs include a date selection dialog and a reference value selection dialog. A reference value selection dialog can list the valid values of a corresponding reference table.

In some embodiments, an administrator is presented with a user interface for reviewing and modifying the generated digital form. Once acceptable, the administrator can verify the reviewed digital form is correct and a conversation bot can be generated and outputted at step 207. In some embodiments, step 205 is optional and a conversation bot is automatically generated without administrator modifications.

At 207, a validated conversation bot is outputted. For example, using the verified digital form configured at 205, a conversation bot is automatically configured and generated. In some embodiments, the generated conversation bot is an update to an existing conversation bot but supports the newly generated digital form. The generated conversation bot can be accessed and used by users to provide responses to the generated digital form. In some embodiments, the conversation bot is a web application that can be hosted on a web and/or application server and is accessible via a network connection. The conversation bot may utilize a remote data store for persistent storage. For example, a database backend may be used to store collected user data captured by the conversation bot. In various embodiments, other conversation bot platforms are appropriate as well and may be utilized as an alternative or in addition to a web application. For example, other platforms include mobile platforms, desktop platforms, kiosk platforms, and/or another appropriate platform. The different platforms may utilize the same persistent computer storage but implement a client interface differently.

In some embodiments, persistent computer storage utilized by the generated conversation bot is configured as part of step 207. For example, one or more database tables may be created in a network database server for storing collected user responses. In some embodiments, the database or corresponding data store is created at a later time such as when the conversation bot is executed and/or when the corresponding digital form is utilized via the conversation bot.

Figure 3:
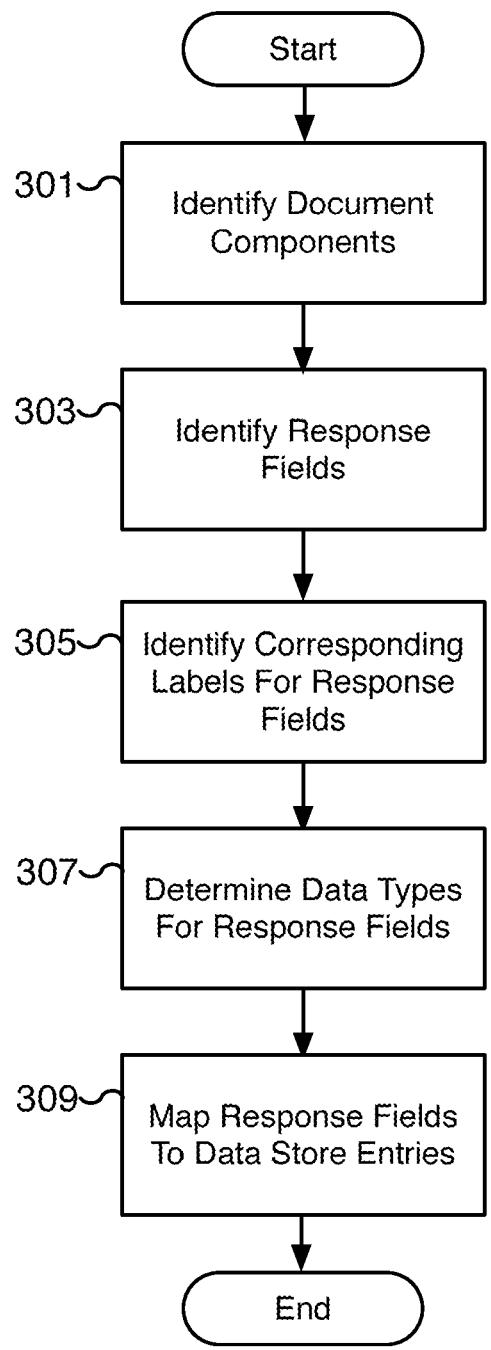
FIG. 3 is a flow chart illustrating an embodiment of a process for automatically analyzing an input document data.

FIG. 3 is a flow chart illustrating an embodiment of a process for automatically analyzing an input document data. For example, the process of FIG. 3 may be utilized to identify response fields and corresponding text labels within a physical form document for converting the form to a conversation bot. In some embodiments, the process of FIG. 3 is performed at 201 of FIG. 2.

At 301, document components are identified. For example, different relevant components of the document data are identified and separated from non-relevant components. For example, response fields and corresponding text labels and annotations are identified. In some embodiments, non-response text labels such as headers, titles, sub-titles, text descriptions, captions, etc. are identified. Non-response text labels may correspond to directions or instructions for the user. Non-response image components such as logos, photos, images, etc. can be identified as well. In various embodiments, the input document data is analyzed and different components within the document data are identified for further processing. In some embodiments, the identification of document components is performed using an image analysis of the input document data. In some embodiments, one or more document components may already be identified by the format of the input document data, for example, by relevant metadata included in the input document data.

In various embodiments, the image analysis includes performing object character recognition to identify text. For example, in an initial pass, all text in the form document is identified using an OCR service. Once identified, the text is removed and the remaining input document data is processed to identify remaining document components, such as response fields. The response fields may include rectangular input boxes, check boxes, radio buttons, sequence of underscores, search fields, date fields, reference fields, tables, etc. In various embodiments, the response fields are detected by identifying the shape of the field. Similarly, annotations can be identified by their shape/image and/or other appropriate features (such as color). Each annotation type may be configured to have a unique design which can be utilized for identification. For example, a date annotation can utilize a calendar icon, a reference annotation can utilize a database table icon, and a mandatory field annotation can utilize an asterisk icon. Once the different components are identified, they can be classified as a non-response field, a response field, a text label, an annotation, or another document component type. Some formats of document components, such as response fields and corresponding labels, require further processing.

In some embodiments, document components including response fields are identified by extracting features using a modified version of the Hough transformation. For example, each black pixel in a white background is identified and fit into a line equation in polar form. For a particular rho and theta from the origin, the number of points that exist in that line is counted and stored in an accumulator matrix containing all possible rho and theta values. A determination is made for a particular theta and rho value pair whether the count of the points in the corresponding line equation exceeds a threshold value. In the event the threshold value is met, the points are determined to be part of a line with the particular corresponding rho and theta position. In some embodiments, an implementation of the Hough transformation takes all global maxima above a particular defined threshold. In various embodiments, the document components are identified by extracting features using another technique such as an iterative end-point fit algorithm. For example, pixels of an image are approximated to polygonal curves using a Ramer-Douglas-Peucker algorithm.

To improve results for a variety of input document data including data corresponding to hand-drawn lines and images with short bursts of straight printed lines, in some embodiments, the local maxima of every angle is extracted individually. This technique improves the quality of the document component analysis and significantly reduces the amount of noise while improving the ability to identify the outline of shapes. All local maxima of an angle are in close proximity in rho to the local maxima of the closest angles. This form streaks in the heat map of the accumulator matrix. The outer streaks run through 180 degrees and represent the convex outline of a shape. The inner streaks may be smaller and represent the concave outlines of the shape. If only the outline is detected with no inner streaks, a determination is made that the shape is a convex shape. Once all shapes in the input document data are identified, the shapes are classified to identify the particular component type, such as a radio button, a check box, or a text-box, etc.

In various embodiments, different tolerance levels with respect to the changes in angles can be defined to process different types of images. For example, for hand drawn images, an appropriate tolerance level for the changes in angles is defined. The tolerance level is raised to allow for lines that are not perfectly straight. For every streak which represents a continuous line, a maxima in the tolerance level of the angle can be configured. For example, using a tolerance level such as 20 degrees, on average, changes of up to 20 degrees are allowed for corresponding points to still be considered part of a single straight line. In some embodiments, concave shapes are identified by proceeding in a cyclic order from one line to the next and checking all angles and removing noise. As an initial pass, for a hand-drawn form document, these shapes are marked as placeholders. Once all shapes in the input document data are identified, the shapes are classified to identify the particular component type, such as a radio button, a check box, or a text-box, etc.

In various embodiments, table document components are identified by approximating the contour shape of the table. The identification of the table contour allows a table with multiple response fields to be identified with improved accuracy. In some embodiments, the contour is identified using an iterative end-point fit algorithm such as the Douglas-Peucker algorithm. In some embodiments, the various techniques are implemented in part by using a real-time computer vision library such as OpenCV.

At 303, response fields are identified. For example, response fields corresponding to portions in the input document data for users to enter responses are identified from the components identified at 301. Example response fields for collecting user responses include blank fields (or a sequence of underscores), boxes, checkmark targets (or checkboxes), radio buttons, search fields, date fields, reference fields, tables, and selection fields, among others. For example, a name text label may be followed with a blank field depicted as a long underscore and is intended for collecting a user's name. As another example, an empty checkmark target can be marked by a user for denoting a bank account is a checking account.

In some embodiments, the response field is a selection response field that allows the user to select from the provided response. For example, a list of possible answers is provided and the user can select a single response, select multiple responses, rank the responses, or answer using another response format, depending on the type of selection response field. In some embodiments, a single exclusive multiple-choice selection response field provides multiple responses but a user can only select a single response. A non-exclusive multiple-choice selection response field provides multiple response options and more than one (non-exclusive) response can be selected by the user. For a ranked selection response field, a user ranks the provided responses in order, for example, by numbering the choices. In various embodiments, selection response fields may utilize checkmark targets (or checkboxes), radio buttons, or another appropriate user interface element to display potential selection choices.

In some embodiments, response fields are grouped together to form a larger collective response. For example, information related to a former employer for an employment history response may include responses for the name of the employer, designation (or title), address, and the total time of the job experience. Each response field for the collective response is identified and can be grouped together. In some embodiments, the collective response is identified as a table document component.

In some embodiments, multiple response fields are determined to be a table. For example, a group of response fields for entering multiple employment history entries is identified as a table for collecting multiple entries of the same type. As another example, a response field requesting a list of classes previously taken is identified as a table for collecting multiple class responses.

At 305, corresponding labels for response fields are identified. For example, corresponding labels for the response fields identified at 303 are identified from the components identified at 301. In some embodiments, the labels are text labels. For example, the text label "Name of Candidate:" may precede and correspond to a response field for a user's name. Similarly, text labels "Urban" and "Rural" may be associated with empty checkmark target response fields. In various embodiments, a corresponding label is identified for each response field identified at 303 using spatial rules. For example, a response field and the nearest label positioned to the left or above the response field are mapped as a key value pair. Other spatial rules can be implemented as appropriate and may vary depending on the response field type.

In some embodiments, labels corresponding to collective responses and/or tables are identified. For example, a collective label "Educational Qualifications" is identified and corresponds to a table for field responses. Moreover, each entry in the table can include multiple labels with corresponding response fields. For example, each entry can include multiple text labels such as "Name of Degree," "Year of Passing," "Board/University," "Grade/Division/CGPA," and "Specialization (If Any)" text labels with corresponding response fields.

At 307, data types for response fields are determined. For example, a data type for each response field is determined at least in part by analyzing the response field, text label, and any associated annotations. For example, in some embodiments, the text label is parsed to determine keywords and matched with data types associated with the keywords. The text "name" may be associated with a string type whereas the text "age" may be associated with a positive integer type. Similarly, the text "Date of Birth" may be associated with a date type. In some embodiments, the response field is utilized as well to help determine the data type. For example, an empty checkmark target response field may be associated with a Boolean type. In some embodiments, the data type determination includes identifying the response field as being part of a table. In some embodiments, an annotation is used at least in part to determine a data type. For example, a calendar annotation indicates that the data type is a date type. As another example, a reference annotation indicates that the data type is a reference type and may reference an existing database table.

In various embodiments, the supported data types are configurable and can be complex and include multiple components. For example, supported data types can include text (or string), various number formats, date, currency, temperature, weight, and distance data types, among others. Recognized data types can also include component data types, such as an address component, a date component, and a time component data type, among others, where the component data type includes multiple component parts. For example, an address component data type can include a street number, a street name, a city, a county, a state, and a country component. A time component data type can include an hour, minute, second, millisecond, and time zone component.

In some embodiments, at 307, configuration settings such as conditional configurations and mandatary field settings are determined as part of determining a data type for a response field. In some embodiments, a response field can be a conditional response field, a mandatory response field, and/or an optional response field. For example, a conditional response field of a form may only be required to be completed in the event a condition is met. For example, in the event a person is a minor, a form may include a conditional response field corresponding to a parental consent response field. Only a minor completing the digital form via the conversation bot would be asked to respond to the parental consent response field. Correspondingly, an adult completing the digital form via the conversation bot would not be prompted to respond to the parental consent response field. As another example, a form can include both mandatory and optional response fields. In some embodiments, by default, a conversation bot can include only the mandatory response fields. By only including mandatory response fields, a conversation bot only prompts for and gathers the mandatory responses to keep the conversation bot interaction to a minimum.

At 309, response fields are mapped to existing data stores. For example, existing data stores such as database tables are searched to identify relationships between the tables and/or table fields with response fields, corresponding labels, and tables. In some embodiments, the text label is parsed to determine keywords and matched with database table and/or field names. A candidate list of existing data stores is determined. For example, in some embodiments, candidate data stores for a "name of employer" text label and corresponding response field can include database tables named "employers," "companies," and "businesses." In various embodiments, the candidate reference data stores are ranked to determine the closest matching reference. For example, a confidence score of a similarity matching metric is determined for each reference data store and used to rank the reference data stores.

In some embodiments, each response field of a collective response is used to determine whether an existing database table is a match. For example, for a collective response to reference an existing data store, the existing database table must include a corresponding field for each response field of a collective response.

Figure 4:
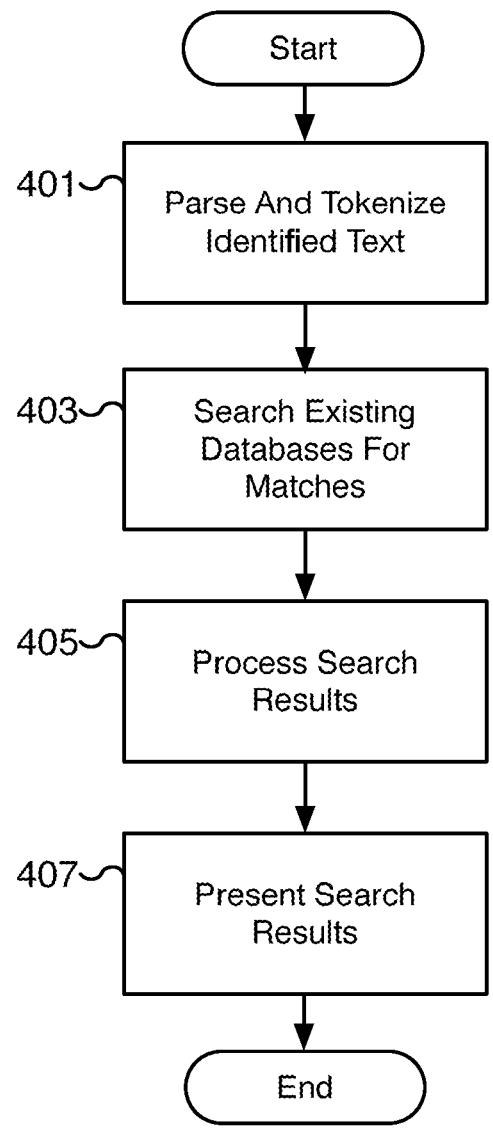
FIG. 4 is a flow chart illustrating an embodiment of a process for automatically configuring a digital form using reference data sources.

FIG. 4 is a flow chart illustrating an embodiment of a process for automatically configuring a digital form using reference data sources. For example, existing data sources such as existing databases and/or data stores are identified and linked to response fields for configuring a digital form that can be completed using a conversation bot. Linking reference sources to response fields allows for a more complex and accurate collection of user data. Similar responses from different users can be collapsed to reference the same reference entry in an existing data source. Moreover, responses can be matched and standardized across different digital forms. For example, multiple digital forms can share the same employee background information by referencing an employee's database table. As another example, multiple digital forms can share the same customer contact database by referencing the same customer database. In some embodiments, the steps 401, 403, and/or 405 are performed at 309 of FIG. 3 and/or the step 407 is performed at 205 of FIG. 2.

At 401, identified text is parsed and tokenized. For example, tokens are created by parsing the text associated with a text label of a corresponding response field. In some embodiments, the tokens function as keywords used to identify matches from existing data sources. In some embodiments, the tokens are lemmatized and are associated with a set of matching strings. For example, in some embodiments, the tokens are associated with a thesaurus of matching keywords. The token for the text "employer" can be associated with the keywords "employer," "employers," "businesses," and "companies."

At 403, existing databases are searched for matches. For example, the processed tokens created from the text labels at 401 are used to search for matches amongst existing databases. The names and metadata of existing databases, their tables, and/or their fields are parsed and tokenized similar to the process performed at 401. For example, database table names are tokenized and the tokens can be lemmatized if necessary. The processed name and related information of existing databases are then compared with the processed tokens from step 401 to identify potential reference databases.

As one example, the matching strings for the token for the text "employer" can include the string keywords "employer," "employers," "businesses," and "companies." A table with the name "employees" matches one of the token string keywords. In some embodiments, only partial matches are needed and base string keywords are utilized. For example, the string keyword "compan" matches a table named "company" and a table named "companies." In some embodiments, the data types of the response fields and existing database fields are also compared to determine matches.

At 405, search results are processed. For example, the search results can be ranked based on best match. In various embodiments, different heuristics can be utilized to determine the ranking order. For example, the matches can be ranked by last used, most frequently used, best string match, or another appropriate ranking technique. In some embodiments, a best match is determined and set as a default match that an administrator can modify at 407 when presented with the results.

At 407, search results are presented. For example, a user interface view is presented to an administrator to display candidate references that match a response field. In some embodiments, an administrator selects from the candidate references to determine which reference should be mapped to a response field. In some embodiments, the candidates are presented from using a drop down list or another appropriate user interface component.

Figure 5:
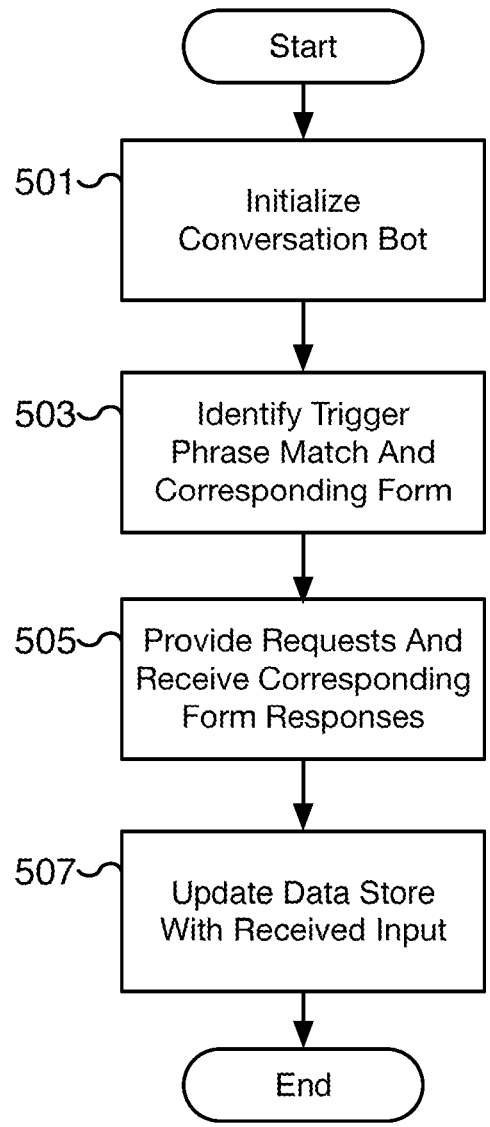
FIG. 5 is a flow chart illustrating an embodiment of a process for collecting form responses using an automatically generated conversation bot.

FIG. 5 is a flow chart illustrating an embodiment of a process for collecting form responses using an automatically generated conversation bot. For example, once an input document data is analyzed to generate a digital form and a corresponding conversation bot for completing the form, the conversation bot is executed to interact with and collect user data. In various embodiments, the conversation bot application has a client portion that interfaces with users and a data store portion. User data is collected from users via the conversation bot client and stored using the data store portion. In some embodiments, the data store is a persistent computer storage such as a remote hosted data store. In some embodiments, the conversation bot includes a server portion such as a web server application portion that implements portions of the conversation bot functionality. For example, the server portion may host a web conversation bot application that is accessed by a client web browser. In some embodiments, the process of FIG. 5 is performed at 105 of FIG. 1.

At 501, the conversation bot application is initialized. For example, in some embodiments, one or more databases for form responses are created for storing user collected data. If existing tables are utilized, new fields in existing tables are created to support new user response fields not present in existing tables. In some embodiments, any referenced data sources based on existing data sources are confirmed to be functioning properly. In various embodiments, the initialization includes launching the conversation bot and/or updating an existing (or currently executing) conversation bot to support a newly supported digital form. For example, a web application version of the conversation bot application can be launched using a web application server and appropriate UI components are instantiated. In some embodiments, the conversation bot application is a mobile application, desktop application, kiosk application, and/or a conversation bot application on another platform and is launched and/or updated appropriately. For example, a mobile application can be launched by the user launching the mobile app.

At 503, a trigger phrase match and corresponding form are identified. For example, a user enters a text message into the conversation bot that includes a trigger phrase. A trigger phrase match of the user's message to a trigger phrase of a digital form is identified. In some embodiments, the trigger phrase is based on the form title and/or a trigger phrase configured by the administrator during configuration. The match can be based on one or more different text matching techniques including full match, partial match, context-based match such as a match based on historical context, etc. A matching trigger phrase is associated with a corresponding digital form. In some embodiments, the user input matches multiple forms. For example, the user's input includes a trigger phrase that multiple forms share. The conversation bot can provide the user a list of matching forms and allow the user to select from the possible matches. In some embodiments, the conversation bot provides a prompt to confirm that the user wants to access the identified form.

At 505, requests are provided and corresponding form responses are received. For example, using the identified digital form at 503, the conversation bot provides requests to the user as prompts for a form response field. In various embodiments, the request prompts are based on the text label associated with the corresponding response field. In response to the prompt request, the user provides a response for the corresponding response field. In this manner, the conversation bot provides requests and receives responses for all response fields configured for the form. In some embodiments, the response fields are only a subset of the response fields of the form. Additional responses can be provided, for example, using a different or additional interface, if necessary.

In various embodiments, as responses are received, the responses are validated to ensure that they meet the data type and configuration requirements of the field. For example, a leave date for an airline reservation travel date can be validated to ensure that the date is in the future and matches an airline itinerary. As another example, a birthdate for a minor can be validated to ensure that the date is in the past and the age associated with the birthdate is for a minor (e.g., under the adult age limit). As an additional example, a body temperature response can be verified to fall within a certain reasonable temperature range for a human. Similarly, a distance travelled for mileage reimbursement field must fall within a valid range. For example, a negative distance would not be valid. As yet another example, an email response field can only receive a valid email address. In some embodiments, the received data is verified by comparing the data to the type of data expected by the data store. For example, in the event a response field is linked to a reference data source, the user's response may be required to match an existing entry in the reference data source. For example, a university response field may only allow a university name that already exists as a known university name in the reference data source. In various embodiments, invalid user responses require the user to submit a new response.

In some embodiments, the user interface for user response collection is configured based on response fields. For example, different response fields can utilize different user selection dialogs. In some embodiments, the type of user response dialog is based on the data type of the response field and/or an annotation associated with the response field. A date response field can utilize a date selection dialog that allows the user to select from valid dates. A Boolean (yes/no or true/false) response field can utilize a Boolean selection user interface. As another example, a reference type response field can utilize a reference value user selection dialog that lists one or more valid reference type values. For example, an airline response field can list valid airlines for the user to select from. The user can then utilize a pointing device, reference number/code for the desired value, auto-complete, and/or another technique to select from the valid reference values. As one example, an Airline response field can have the possible valid values: Air India, Emirates, British Airways, and Singapore Airlines. All four valid responses are provided via the conversation bot along with instructions to select an airline. The particular type of user selection dialog can be configured with the conversation bot, for example, at step 205 of FIG. 2. In some embodiments, the user selection dialog is based on an annotation used in the input document data.

In various embodiments, the non-response field data of the form is also included in the conversation box conversation. For example, a header and/or company logos, general instructions, etc. are also displayed as part of the conversation view. In various embodiments, portions of the conversation bot window visually resemble the original form from which the digital form was automatically generated. For example, a header portion of the form with logos may be displayed at the start of the form response collection. In some embodiments, a thumbnail of a physical form is displayed to the user prior to response collection.

In some embodiments, a summary of the provided responses is shown to the user prior to storing the results. This allows the user to verify that the submitted responses are correct. In the event the responses are correct, the user confirms that the supplied responses should be submitted. In some embodiments, a user can request that provided responses be displayed as requested during the response completion process. For example, a user can type a review command to the conversation bot such as "review responses" or "show responses" to display the current provided responses. In some embodiments, after a response to the last response field is provided, the conversation bot replays all the user provided responses to the user for confirmation.

At 507, the data store is updated with the received user input. For example, user data collected from the response fields at 505 is stored in a persistent data storage. In various embodiments, the persistent data storage is a remote database and/or a cloud-hosted data store. In some embodiments, the data is stored across multiple data stores and/or references data using reference data stores. In some embodiments, once the responses are stored, optional automation processes can be triggered. For example, an automated email can be sent to the user to confirm that the user has completed a form. The email can include a link to provide additional form information as well as the provided response. As another example, a submission of a reservation form can trigger an automated process to reserve the requested booking. As an additional example, a submission of a help or incident form via a conversation bot can create a new ticket and assign the ticket to the appropriate responsible party.

Figure 6:
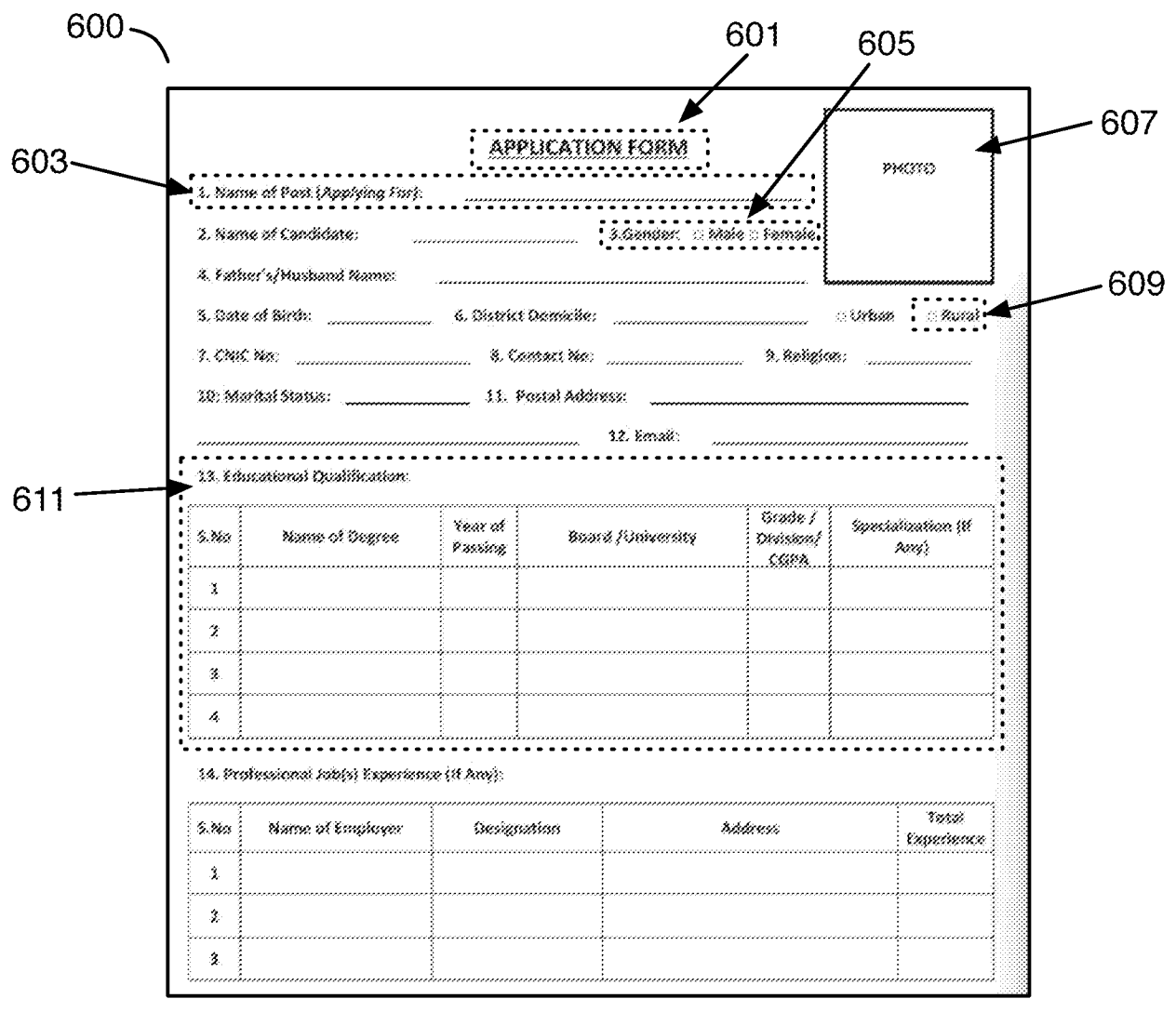

FIG. 6 is a diagram illustrating an example of a physical form document. In some embodiments, physical form document 600 is a form document provided to multiple users for collecting user data. In the example shown, physical form document 600 includes only a portion of the physical document and may include additional response fields and document components not shown. As shown in FIG. 6, physical form document 600 includes multiple document components including components 601, 603, 605, 607, 609, and 611. Additional components are not labeled with numbers but are identified during analysis of physical form document 600 when generating a conversation bot based on the document. In the example shown, component 601 is a header component and a non-response field component. Header component 601 includes the text "APPLICATION FORM" and corresponds to a title for physical form document 600. As a non-response field component, header component 601 does not have a corresponding response field.

In the example of FIG. 6, components 603, 605, 607, 609, and 611 are each associated with a response field and each includes both a response field and corresponding text label. For example, component 603 includes a blank response field and a corresponding text label ("1. Name of Post (Applying For):"). Component 605 includes a selection checkmark target (or checkbox) response field with possible values "Male" and "Female" and a corresponding text label ("3.Gender:"). Component 607 includes a photo response field and a corresponding text label ("PHOTO"). Component 609 includes a checkmark target response field and a corresponding text label ("Rural"). Component 611 is a table and with a corresponding text label ("13. Educational Qualification:"). Each table entry in table component 611 includes multiple response fields and corresponding text labels, such as "S.No," "Name of Degree," "Year of Passing," "Board/University," "Grade/Division/CGPA," and "Specialization (If Any)." In the example of physical form document 600, table component 611 allows a user to include four entries. In various embodiments, physical form document 600 is digitized and converted to an input document data. Using the processes of FIGS. 1-5, a conversation bot is automatically generated and configured based on an input document data of physical form document 600 and used to collect user information. Using the generated conversation bot, a user can complete and provide responses to physical form document 600.

Although physical form document 600 is a custom form, the techniques described herein apply to any forms including standard forms such as government published forms. For example, a standard income tax form can be processed using the processes of FIGS. 1-5 to create a conversation bot for prompting a user to provide responses to the standard income tax form. References to fields such as names, addresses, etc. can be linked to existing reference databases such as an employee information database. In various embodiments, the application of the techniques can be applied to a combination of standard and custom forms and allows the data entered into any of the forms to reference one another.

FIG. 7 is a diagram illustrating an embodiment of an administrator user interface for creating a digital form. In the example shown, user interface 700 displays identified response fields and corresponding text labels for a form document, including at least response fields 701, 703, and 705. In some embodiments, the form document analyzed and displayed in user interface 700 corresponds to physical form document 600. In the example shown, only a portion of the analyzed components of physical form document 600 are shown. In various embodiments, user interface 700 is presented to an administrator to modify and/or verify form document components before generating a digital form with the verified components. In various embodiments, the digital form can be used to create a conversation bot. For example, one or more response fields of the digital form can be configured to be included in the generated conversation bot. In some embodiments, user interface 700 is displayed at 203 of FIG. 2 and/or at 407 of FIG. 4. In some embodiments, the response fields are modified by an administrator at 205 of FIG. 2.

In various embodiments, user interface 700 is displayed to an administrator once response fields and corresponding text labels of a form document have been identified. The data types of the response fields have been determined and potential relationships to existing data sources are presented. For example, response field 701 corresponds to document component 603 of FIG. 6. As shown in user interface 700, response field 701 is configured to receive a text (string) data type. Additional configuration fields include a mandatory field, a potential reference field, and an include column field. In some embodiments, a mandatory field determines whether the response must be completed or whether the form can be submitted with the field left blank. In some embodiments, only mandatory fields are included by default for a generated conversation bot. When triggered to collect a particular form's response fields, the conversation bot will only prompt the user for responses to response fields that have been configured to be included in the conversation bot (such as mandatory fields). In some embodiments, user interface 700 can be configured to show an additional include in agent field (not shown) to allow additional fields (other than mandatory fields) to be included in the conversation bot. For example, the include in agent field can be enabled when configuring the digital form to be supported by a conversation bot. An example of the include in agent field is shown in FIG. 11.

In some embodiments, the reference type associated with the response field is used to reference a data source such as another database table. The referenced database table can be part of the same database used for the storing entries for the associated form document or an external reference database. For example, as shown in user interface 700, response field 703 corresponds to document component 605 of FIG. 6 and is a reference data type. The reference type is configured to "gender_218_list," which is a database table separate (or external) from the database table used for the non-reference type entries. In some embodiments, the reference table may be part of the same database or part of another database. As another example, response field 705 corresponds to document component 609 of FIG. 6 and is also a reference data type. The reference type is configured to "none" which results in the creation of a new database table for response field 705 instead of referencing an existing database table. For each response field, an include column field is also displayed. The include column field allows the administrator to include or not include the response field in a corresponding digital version of the form. For example, corresponding database columns are created only for response fields where the include column field is enabled.

FIG. 8 is a diagram illustrating an embodiment of an administrator user interface for creating a table in a digital form. In the example shown, user interface 800 displays an identified table analyzed from a form document and the corresponding response fields for the identified table. In some embodiments, the form document analyzed and displayed in user interface 800 corresponds to physical form document 600. In the example shown, only the portion of physical form document 600 corresponding to table document component 611 is shown. In various embodiments, user interface 800 is presented to an administrator to modify and/or verify form document components before generating a conversation bot for collecting responses corresponding to one or more of the verified components. In some embodiments, user interface 800 is displayed at 203 of FIG. 2 and/or at 407 of FIG. 4. In some embodiments, the response fields are modified by an administrator at 205 of FIG. 2.

In various embodiments, user interface 800 is displayed to an administrator once response fields and corresponding text labels of a table within a form document have been identified. In the example shown, five candidate reference tables are identified and the one selected has the table name "Educational Qualification Table 2020s." In various embodiments, an administrator can switch between different reference tables. The response fields for each table entry are also displayed in user interface 800. For example, response fields corresponding to "S. No," "Name of Degree," "Year of Passing," "Board or University," "Grade or Division or CGPA," and "Specialization (If Any)" fields are shown along with their configuration parameters such as configurations for the data type, mandatory, reference, and include column fields. In some embodiments, only response fields with a corresponding mandatory field enabled are included by default in a generated conversation bot. In some embodiments, user interface 800 can be configured to show an include in agent field (not shown) to allow additional fields (other than mandatory fields) to be included in the conversation bot. For example, the include in agent field can be enabled when configuring the digital form to be supported by a conversation bot. An example of the include in agent field is shown in FIG. 11.

Figure 9A:
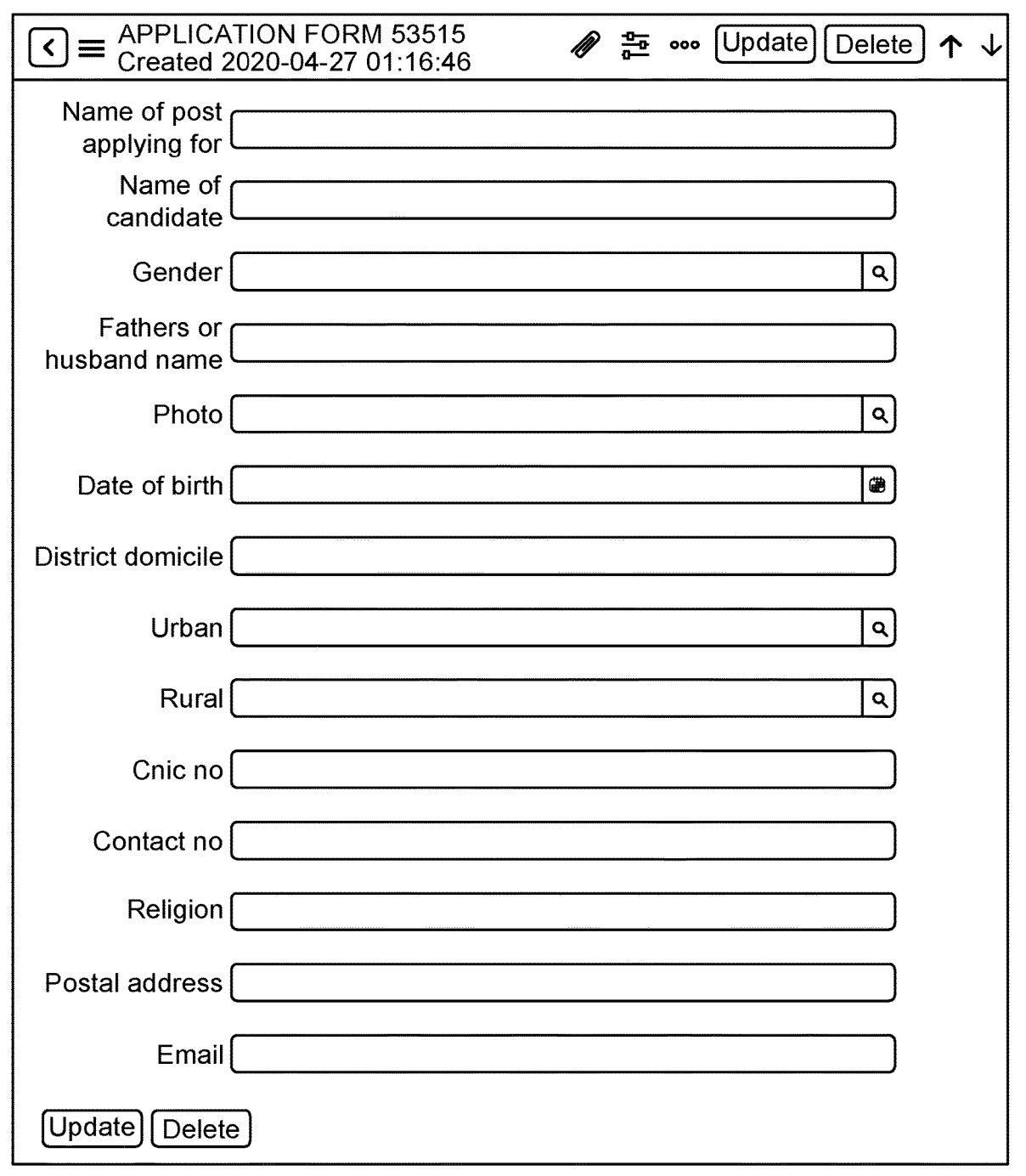
Figure 9B:
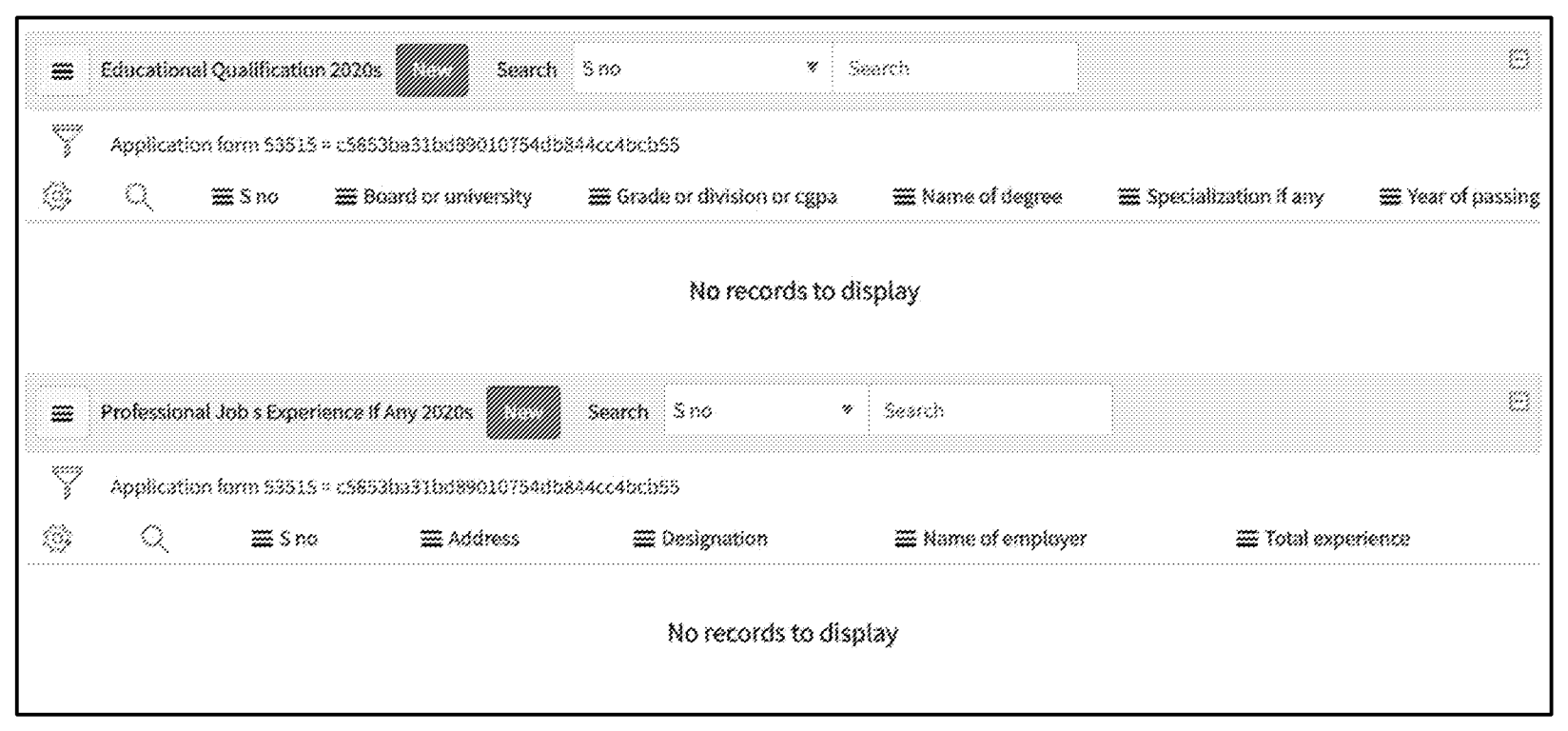

FIGS. 9A and 9B are diagrams illustrating an embodiment of a user interface for a computer form application. FIG. 9A represents the top portion of the user interface and FIG. 9B represents the bottom portion of the user interface. In some embodiments, the user interface of FIGS. 9A and 9B is displayed by an automatically generated computer form application to a user for collecting user data. The computer form application allows a user to provide responses to any of the included response fields of a digital form including fields that may have been excluded by a conversation bot. For example, a conversation bot prompts a user for responses to only the selective response fields of the form that are included in the conversation bot whereas a corresponding computer form application of the form may allow a user to edit and/or provide responses to any fields of the form including non-mandatory fields and fields excluded from the conversation bot. In various embodiments, access to the computer form application is provided to a user in the conversation bot, for example, by providing a URL to access the corresponding computer form application. Access to a corresponding computer form application can be provided based on context. For example, in the event there are more than a threshold number of mandatory fields required by a digital form, access to the computer form application is provided to allow the user an alternative interface to complete a longer form. In some embodiments, access to the corresponding computer form application is provided in the event there are a threshold number of non-mandatory fields excluded by the conversation bot. In some embodiments, access to the corresponding computer form application is provided to allow a user to easily review/modify any of the provided form responses and/or to add additional responses to form requests not included in the conversation bot. In some embodiments, the computer form application corresponds to physical form document 600 of FIG. 6 and/or an analyzed and validated form with corresponding response fields and text labels of FIGS. 7 and 8. Utilizing the shown user interface, users can input user data based on a custom form document that is collected and stored at a persistent data storage and/or modify responses provided via a conversation bot.

In the example shown, FIG. 9A depicts the implementation of different user interface components for different response fields with different data types. For example, user interface components for "Gender," "Urban," and "Rural" response fields each include a magnifying glass to reveal a binary selection and each corresponds to a checkmark target (or checkbox) in the corresponding physical form. In some embodiments, the checkmark target (or checkbox) can be implemented with a different binary selection user interface component such as a binary selection box. The "Photo" response field allows the user to select a binary file such as a digital image to upload a photo. In some embodiments, the "Photo" user interface response field allows the user to explore an existing set of photos, such as a database of the user's photos. The "Date of birth" response field requires the user enter a valid date using a date selection user interface component. Other response fields allow the user to enter text such as the name of the candidate. In the example of FIG. 9B, two table document components are shown, one for entering educational qualifications and one for entering professional experience. Also shown are the references to existing database tables "Educational Qualifications 2020s" and "Professional Job s Experience If Any 2020s," respectively. The corresponding table user interface components allow multiple entries to be added to each respective table document section using the referenced database tables. In the example shown, each table entry includes multiple fields as required by the corresponding physical form document.

Figure 10:
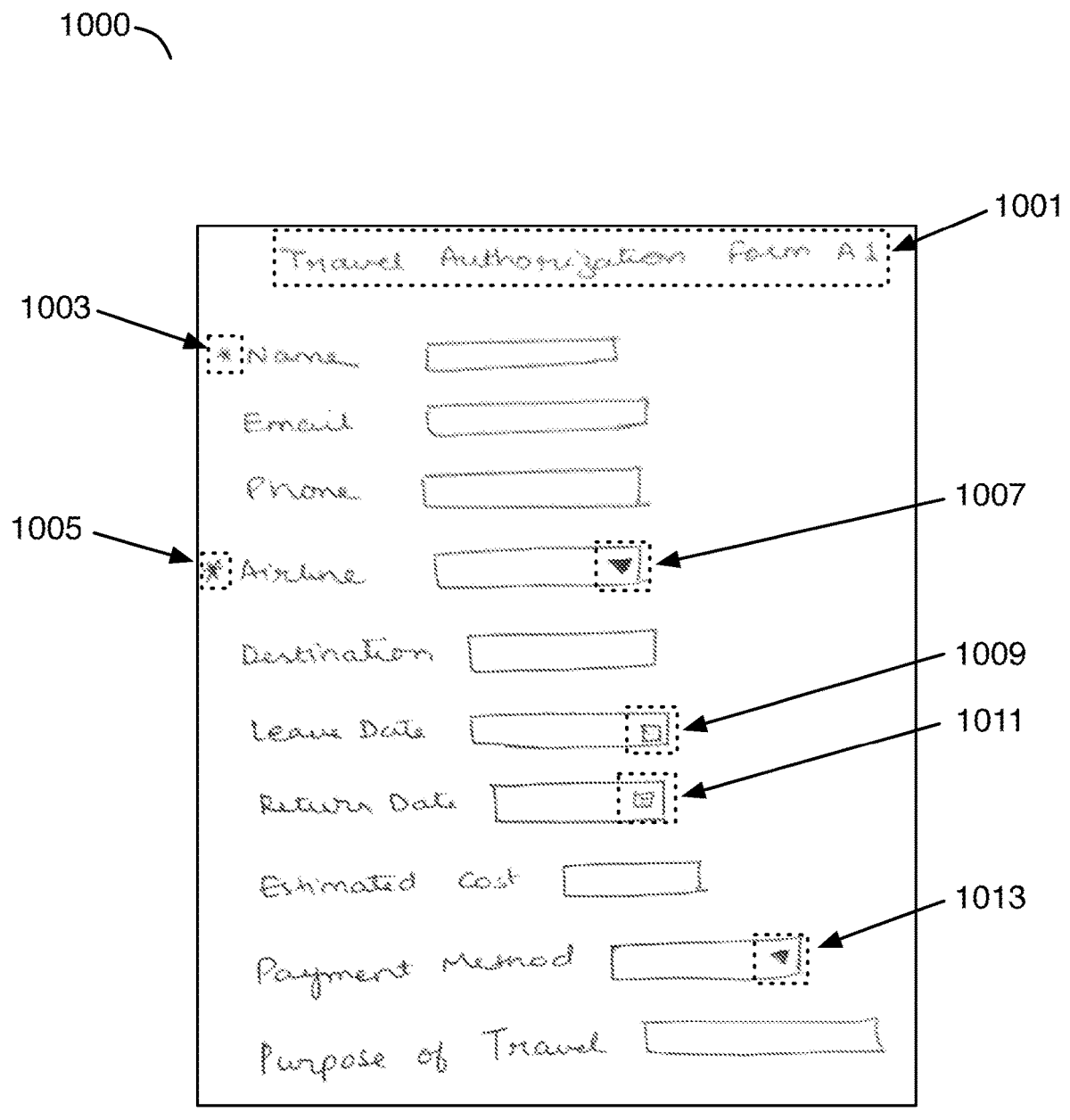

FIG. 10 is a diagram illustrating an example of an annotated physical form document. In some embodiments, physical form document 1000 is a hand drawn form document that includes annotations for certain response fields. As shown in FIG. 10, physical form document 1000 includes multiple document components including header component 1001, response fields and corresponding text labels (not numbered), and various annotations 1003, 1005, 1007, 1009, 1011, and 1013. Although some components including the response fields and corresponding text labels are not labeled with numbers, they are identified during analysis of physical form document 1000 when generating a digital form and conversation bot based on the document. In the example shown, component 1001 is a header component and a non-response field component. Header component 1001 includes the text "Travel Authorization Form A1" and corresponds to a title for physical form document 1000. As a non-response field component, header component 1001 does not have a corresponding response field. In some embodiments, header component 1001 is used to create a trigger phrase for the corresponding generated digital form.

In the example of FIG. 10, annotations 1003, 1005, 1007, 1009, 1011, and 1013 are each associated with a response field and are used to configure the conversation bot. Annotations 1003 and 1005 are mandatory field setting annotations and indicate the associated response fields are mandatory response fields. In the example shown, mandatory field setting annotations 1003 and 1005 resemble asterisks. In some embodiments, an administrator can annotate a previously generated document with mandatory field setting annotations to indicate which fields are mandatory. In the example shown, physical form document 1000 includes two mandatory fields corresponding to Name and Airline response fields. Additional annotations can also be supported. Annotations 1007 and 1013 are reference annotations and in the example shown, resemble drop down triangles. Reference annotations 1007 and 1013 are used to indicate that the corresponding response fields require reference values. The user supplied reference values should correspond to values in an existing (or new) database table. For example, physical form document 1000 includes two response fields which require reference values. The Airline response field can map to an airline database table and the Payment Method response field can map to a payment method database table. Annotations 1009 and 1011 are date annotations and in the example shown, resemble calendar icons. Date annotations 1009 and 1011 are used to indicate that the corresponding response fields require date values. Unlike a free-form month, day, and year combination of values, a date annotation can require that the corresponding response field have a date value where the month, day, and year is a valid combination of date values. In the example shown, physical form document 1000 includes two response fields which require date data values, one for a Leave Date and one for a Return Date.

In various embodiments, physical form document 1000 is digitized and converted to an input document data. Using the processes of FIGS. 1-5, a conversation bot is automatically generated and configured based on an input document data of physical form document 1000 and used to collect user information. Using the generated conversation bot, a user can complete and provide responses to the travel authorization form of physical form document 1000. For example, a trigger phrase such as "travel request" can be configured for the digital form. A user can then send a message such as "fill travel request" to initiate (and trigger) completing the digital form using the conversation bot.

FIG. 11 is a diagram illustrating an embodiment of an administrator user interface for generating a conversation bot. In the example shown, user interface 1100 displays identified response fields and corresponding text labels for a form document, including at least response fields 1101, 1103, and 1105. In some embodiments, the form document analyzed and displayed in user interface 1100 corresponds to physical form document 1000. In various embodiments, user interface 1100 is presented to an administrator to modify and/or verify form document components and to configure a conversation bot with the verified components. In some embodiments, user interface 1100 is displayed at 203 of FIG. 2 and/or at 407 of FIG. 4. In some embodiments, the response fields are modified by an administrator at 205 of FIG. 2. In various embodiments, unlike user interface 700 of FIG. 7, user interface 1100 includes an include in agent field to configure which response fields are included in a generated conversation bot.

In various embodiments, user interface 1100 is displayed to an administrator once response fields and corresponding text labels of a form document have been identified. The data types of the response fields have been determined and potential relationships to existing data sources are presented. For example, response field 1101 corresponds to the Name component of FIG. 10. As shown in user interface 1100, response field 1101 is configured to receive a text (string) data type and is a mandatory field. Additional configuration fields include a potential reference field, an include in agent field, and an include column field.

In some embodiments, a mandatory field determines whether the response must be completed or whether the form can be submitted with the field left blank. In some embodiments, mandatory field settings have been determined and the corresponding mandatory response fields are automatically included by default for a generated conversation bot (or virtual agent). Mandatory fields have a corresponding "1" value for the mandatory? field and a default checkmark for the include in agent field. User interface 1100 reflects that response fields for Name and Airline are mandatory fields. In various embodiments, the Name and Airline mandatory fields are indicated by mandatory field setting annotations 1003 and 1005, respectively, of FIG. 10. When triggered to collect a particular form's response fields, the conversation bot will prompt the user for responses to response fields with the mandatory field setting enabled.

In the example shown, response field 1103 corresponds to the Airline component of FIG. 10 and is an example of a reference data type. Response field 1103 is configured to allow responses that are entries of the database table u_airline. As with Name response field 1101, Airline response field 1103 is a mandatory field and is included in the conversation bot. When triggered to collect a response for response field 1103, the conversation bot can only allow responses that are valid entries in the u_airline table. In some embodiments, the valid entries may be displayed using a user selection dialog in the conversation bot. In the example shown, the response fields for Airline and Payment Method are reference data types and are indicated as such by reference annotations 1007 and 1013, respectively, of FIG. 10.

As another example, response field 1105 corresponds to the Leave Date component of FIG. 10 and is an example of a date data type. Unlike the Return Date response field, leave date response field 1105 is marked to be included in the conversation bot since the include in agent field has been enabled. Although not a mandatory field, the administrator has enabled the field to be included in the conversation bot. In the example shown, the response fields for Leave Date and Return Date are both date data types and are indicated as such by date annotations 1009 and 1011, respectively, of FIG. 10.

In the example shown, user interface 1100 includes an include in agent field. As shown in the example, the field has three possible settings: a default checkmark (corresponding to a mandatory field), an administrator enabled checkmark (a checkmark surrounded by a box), and an unchecked (or not enabled) setting. In various embodiments, the response fields enabled using the include in agent field are included in a generated conversation bot. For example, Email, Destination, Leave Date, and Payment Method response fields are not mandatory fields but have their corresponding include in agent field enabled. When triggered to collect responses to a digital form's response fields, the conversation bot will prompt the user for responses to response fields that are enabled for inclusion in the conversation bot (or agent). Responses to response fields where the include column field is enabled but the include in agent field is not enabled can be provided via another interface, such as a web form interface or a custom computer form application. For example, a response to Phone, Return Date, Estimated Cost, and Purpose of Travel response fields can be provided via the user interface of FIG. 16 if desired.

Figure 12:
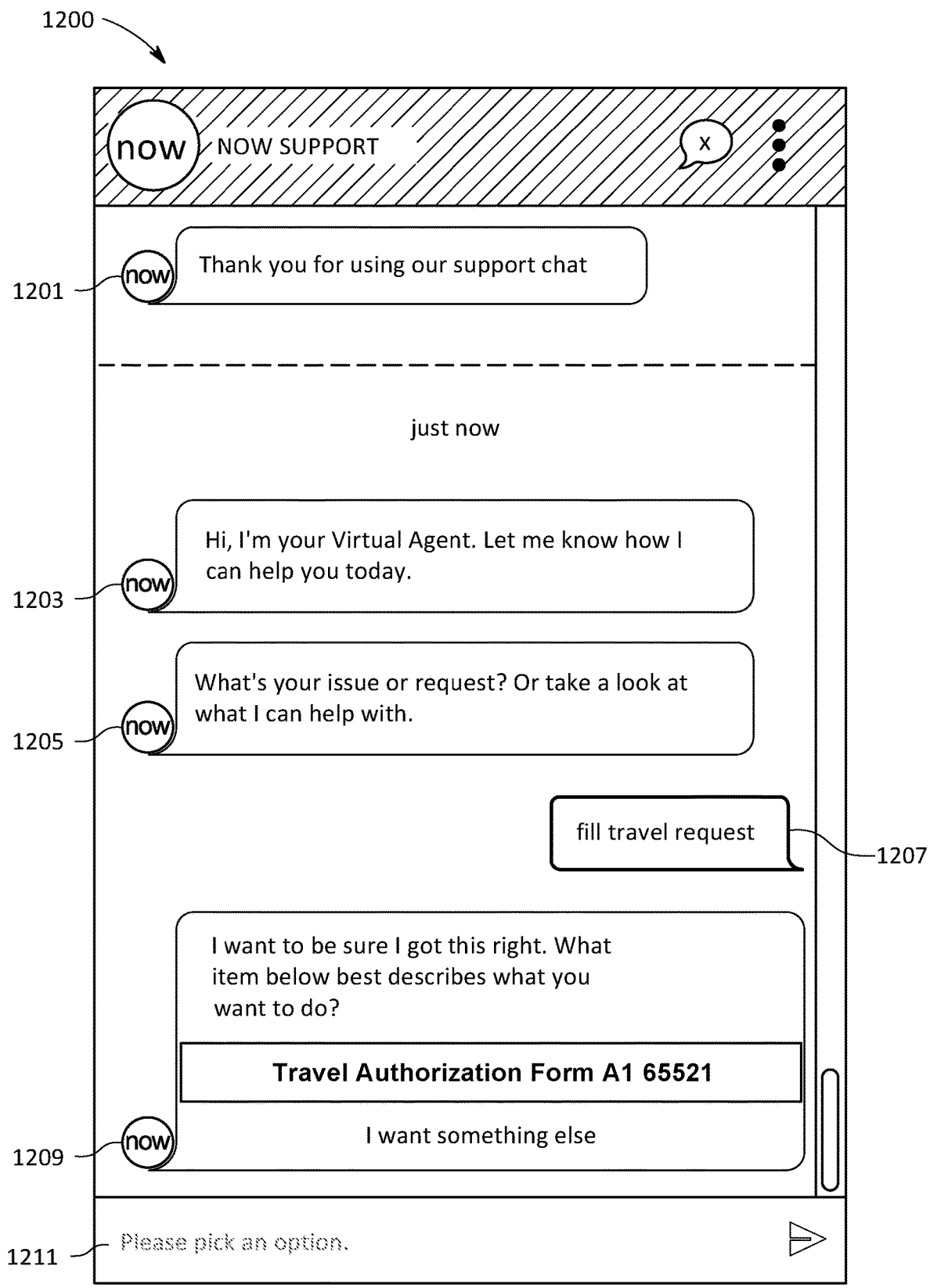
FIG. 12 is a diagram illustrating an example user interface of a conversation bot for initiating collection of user form information.

FIG. 12 is a diagram illustrating an example user interface of a conversation bot for initiating collection of user form information. In the example shown, conversation bot dialog 1200 displays two conversation sessions between a conversation bot and a user. Messages 1201, 1203, 1205, and 1209 are provided by the conversation bot. Message 1207 is provided by a user communicating with the conversation bot. Instruction dialog 1211 includes instructions provided by the conversation bot to help direct the user's next action. In some embodiments, conversation bot dialog 1200 is implemented at least in part by a conversation bot generated using the processes of FIGS. 1-4. In some embodiments, the interactions of conversation bot dialog 1200 occur at step 501 and/or 503 of FIG. 5. In various embodiments, the form referenced by the user in message 1207 of conversation bot dialog 1200 is the digital form of physical form document 1000 of FIG. 10.

In the example shown, message 1201 is a closing message from a previous chat session. Messages 1203 and 1205 are examples of welcome messages that appear at the start of a new conversation session between the user and the conversation bot. Message 1207 is a user message "fill travel request" that initiates filling out a travel request form. In various embodiments, message 1207 matches a trigger phrase of a particular form such as the digital form associated with physical form document 1000 of FIG. 10. In response to the identified trigger phrase match, message 1209 is provided to the user as confirmation that the correct digital form is selected. In various embodiments, message 1209 is a form selection dialog. In some embodiments, multiple forms can be shown in a form selection dialog, for example, in the event multiple forms are triggered by the same user message. Along with form selection dialog and message 1209, instruction dialog 1211 is displayed to guide the user's next action. In the example shown, instruction dialog 1211 includes the message "Please pick an option."

Figure 13:
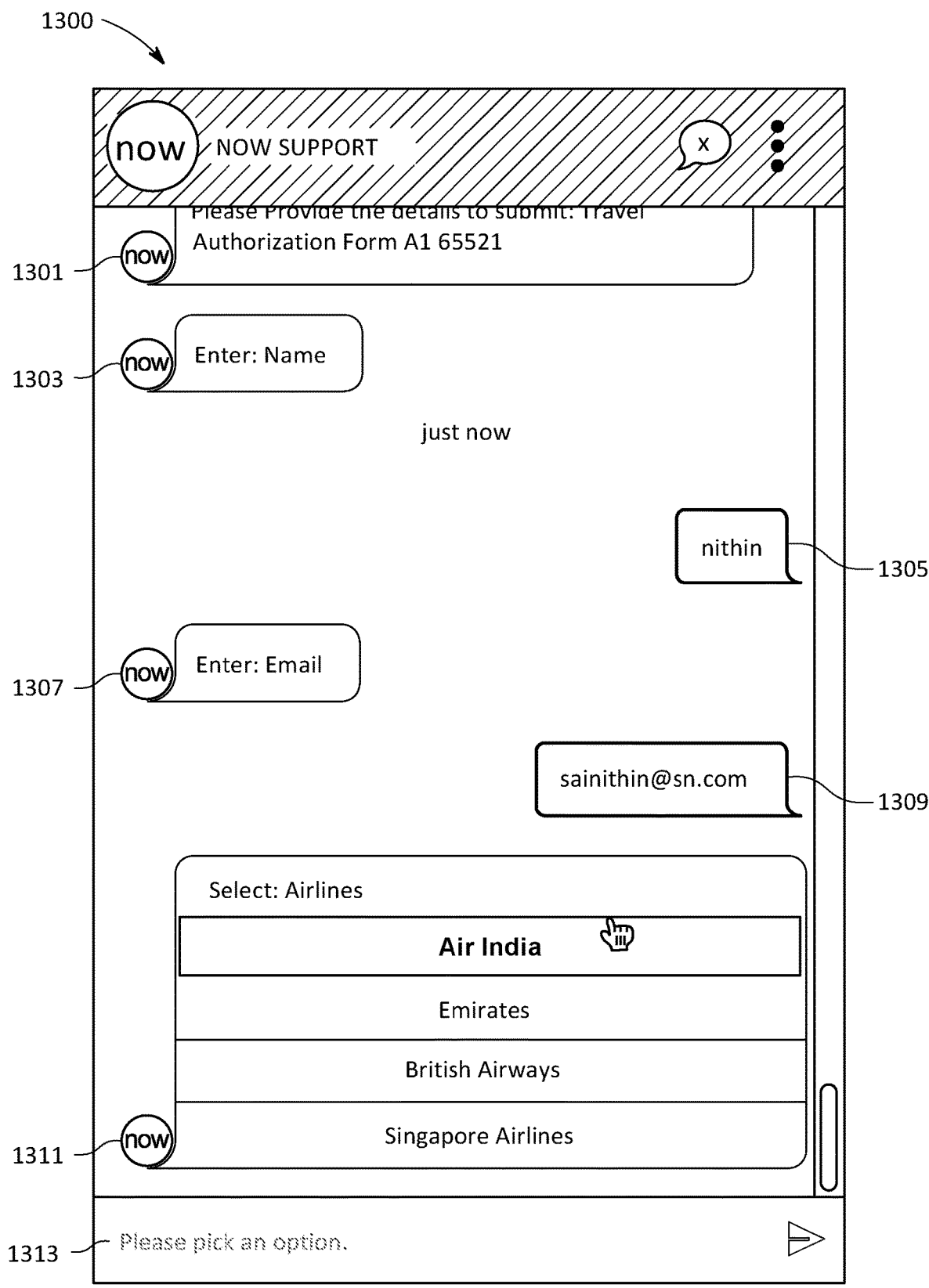
FIG. 13 is a diagram illustrating an example user interface of a conversation bot for collecting user form information.

FIG. 13 is a diagram illustrating an example user interface of a conversation bot for collecting user form information. In the example shown, conversation bot dialog 1300 displays a conversation session between a conversation bot and a user. In some embodiments, the conversation is a continuation of the conversation initiated and shown in FIG. 12. Messages 1301, 1303, 1307, and 1311 are provided by the conversation bot. Messages 1305 and 1309 are provided by the user communicating with the conversation bot. Instruction dialog 1313 includes instructions provided by the conversation bot to help direct the user's next action. In some embodiments, conversation bot dialog 1300 is implemented at least in part by a conversation bot generated using the processes of FIGS. 1-4. In some embodiments, the interactions of conversation bot dialog 1300 occur at step 505 of FIG. 5. In various embodiments, the form of conversation bot dialog 1300 corresponds to the digital form of physical form document 1000 of FIG. 10.

In the example shown, message 1301 is an instructional message that provides directions for the user on responding to response field prompts for a selected form. Messages 1303 and 1305 are a request and response pair. Message 1303 ("Enter: Name") requests that the user provides a name. Message 1305 is the user's response with the user's name ("nithin"). Similarly, messages 1307 and 1309 are a second request and response pair. Message 1307 ("Enter: Email") requests that the user provides an email. Message 1309 is the user's response with the user's email ("sainithin@sn.com"). Message 1311 corresponds to the Airline and next response field of the form. Message 1311 is a reference user selection dialog and includes the message "Select: Airline" and the available selections: Air India, Emirates, British Airways, and Singapore Airlines. In the example shown, the user is hovering over the current selection Air India. Instruction dialog 1313 is displayed to guide the user's next action. In the example shown, instruction dialog 1313 includes the message "Please pick an option." In various embodiments, the Name, Email, and Airline messages of messages 1303, 1307, and 1311 correspond to prompts for the corresponding response fields of physical form document 1000 of FIG. 10 and of the associated digital form shown in user interface 1100 of FIG. 11.

Figure 14:
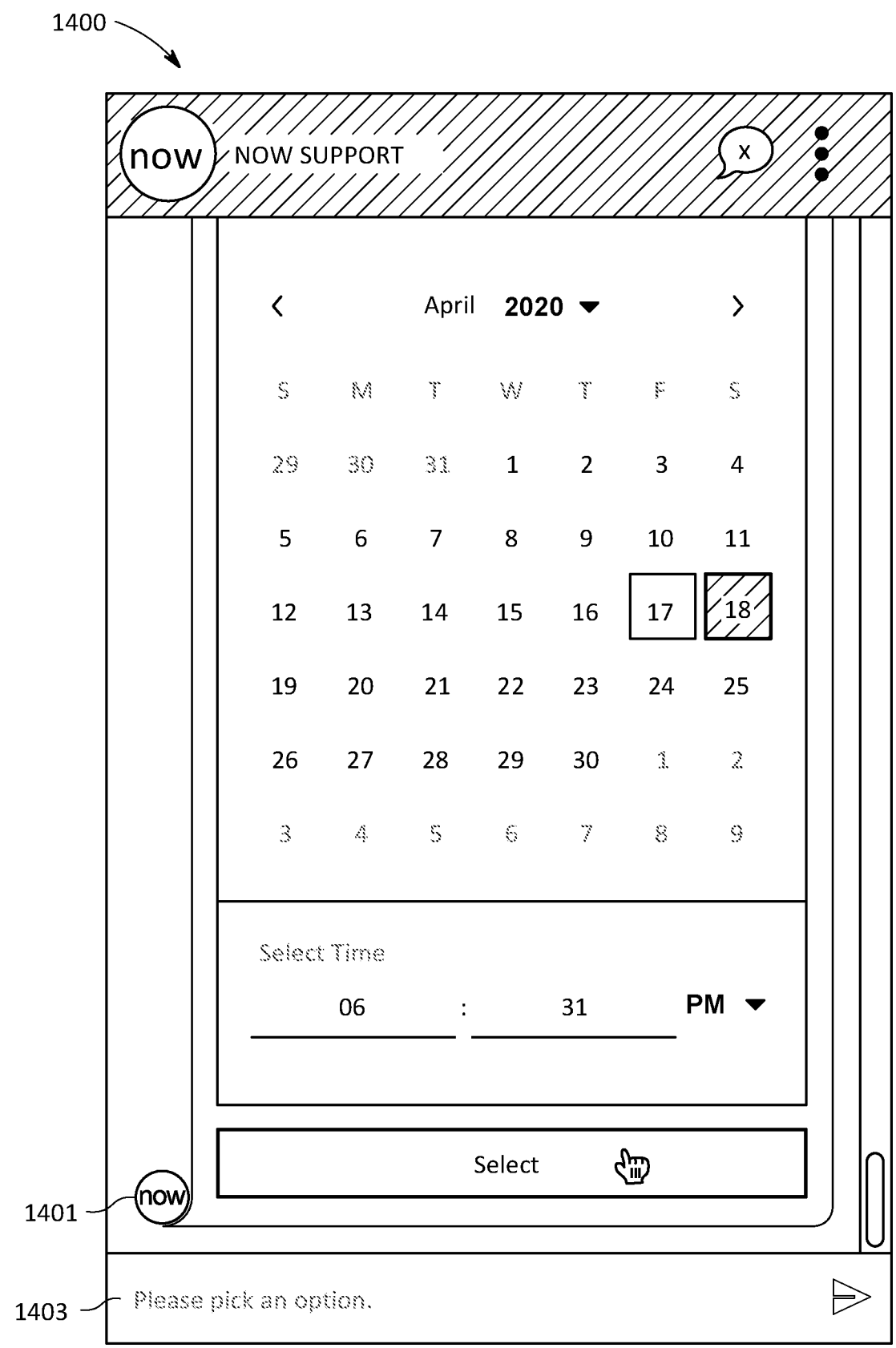
FIG. 14 is a diagram illustrating an example user interface of a conversation bot for collecting user form information using a user selection dialog.

FIG. 14 is a diagram illustrating an example user interface of a conversation bot for collecting user form information using a user selection dialog. In some embodiments, the conversation shown in conversation bot dialog 1400 is a continuation of the conversation shown in FIGS. 12 and 13. In the example shown, conversation bot dialog 1400 displays a user selection dialog and in particular date selection dialog 1401. Date selection dialog 1401 is provided by the conversation bot along with instruction dialog 1403. In some embodiments, conversation bot dialog 1400 is implemented at least in part by a conversation bot generated using the processes of FIGS. 1-4. In some embodiments, the interactions of conversation bot dialog 1400 occur at step 505 of FIG. 5. In various embodiments, the form of conversation bot dialog 1400 corresponds to the digital form of physical form document 1000 of FIG. 10.

In some embodiments, date selection dialog 1401 is provided by the conversation bot after a request and response has already been provided for a Destination response field (not shown). The date selector user interface of date selection dialog 1401 is shown after the message: "Select: Leave Date:" has been displayed. The message is no longer visible in FIG. 14. Date selection dialog 1401 presents the user with a date selector user interface for selecting a valid leave date. In the example shown, the current date is Aug. 17, 2020 and the user has selected Aug. 18, 2020. The user is hovering over the select button of date selection dialog 1401. Instruction dialog 1403 is displayed to guide the user's next action. In the example shown, instruction dialog 1403 includes the message "Please pick an option." In various embodiments, date selection dialog 1401 corresponds to a request prompt for the Leave Date response field of physical form document 1000 of FIG. 10 and of the associated digital form shown in user interface 1100 of FIG. 11.

Figure 15:
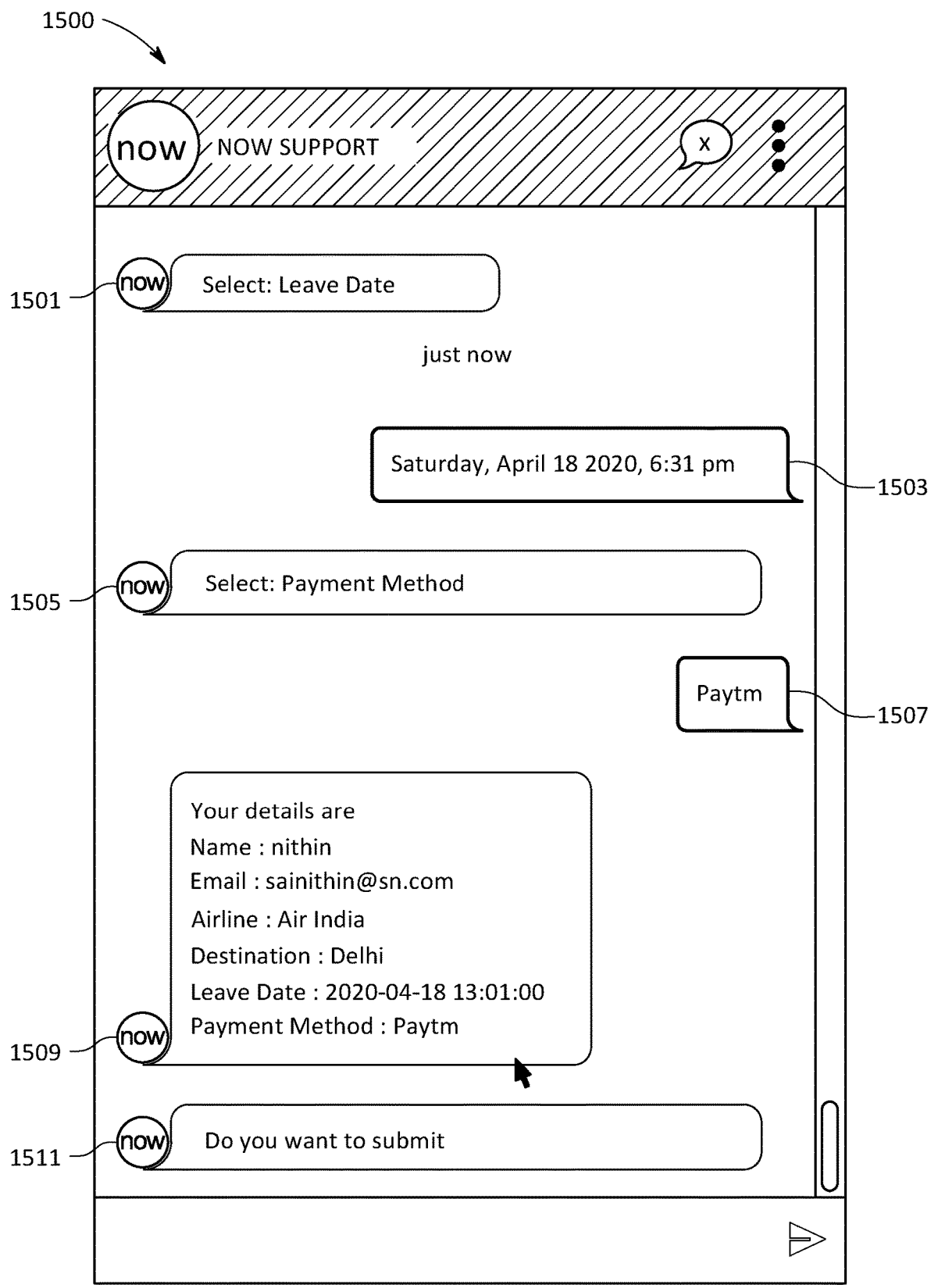
FIG. 15 is a diagram illustrating an example user interface of a conversation bot for collecting and displaying user form information.

FIG. 15 is a diagram illustrating an example user interface of a conversation bot for collecting and displaying user form information. In the example shown, conversation bot dialog 1500 displays a conversation session between a conversation bot and a user. In some embodiments, the conversation is a continuation of the conversation shown in FIGS. 12-14. Messages 1501, 1505, 1509, and 1511 are provided by the conversation bot. Messages 1503 and 1507 are provided by the user communicating with the conversation bot. In some embodiments, conversation bot dialog 1500 is implemented at least in part by a conversation bot generated using the processes of FIGS. 1-4. In some embodiments, the interactions of conversation bot dialog 1500 occurs at step 505 of FIG. 5. In various embodiments, the form of conversation bot dialog 1500 corresponds to the digital form of physical form document 1000 of FIG. 10.

In the example shown, messages 1501 and 1503 are a request and response pair. Message 1501 ("Select: Leave Date") requests that the user provides a leave date. Message 1503 is the user's response with a valid leave date ("Saturday, Apr. 18 2020, 6:31 pm"). In some embodiments, message 1503 is inserted on behalf of the user after the user selects a date using a date selection user interface such as date selection dialog 1401 of FIG. 14. Similarly, messages 1505 and 1507 are a second request and response pair.

Message 1505 ("Select: Payment Method") requests that the user provides a payment method. Message 1507 is the user's response with the user's payment method ("Paytm"). In some embodiments, message 1507 is inserted on behalf of the user after the user selects a reference value for the payment type using a reference selection dialog (not shown). Since the payment type response field is the last field included in the form for the conversation bot, the conversation bot provides summary message 1509 and confirmation message 1511. Summary message 1509 displays the provided user responses to the form requests. Confirmation message 1511 ("Do you want to submit") requests that the user confirm that the user would like to submit the provided responses. In the event the user confirms the submission, the provided responses are stored in a persistent data store. In some embodiments, the submission of the confirmed responses can initiate automated actions. In various embodiments, the Leave Date and Payment Method messages of messages 1501, 1503, 1505, and 1507 correspond to prompts and responses for the corresponding response fields of physical form document 1000 of FIG. 10 and of the associated digital form shown in user interface 1100 of FIG. 11.

Figure 16:
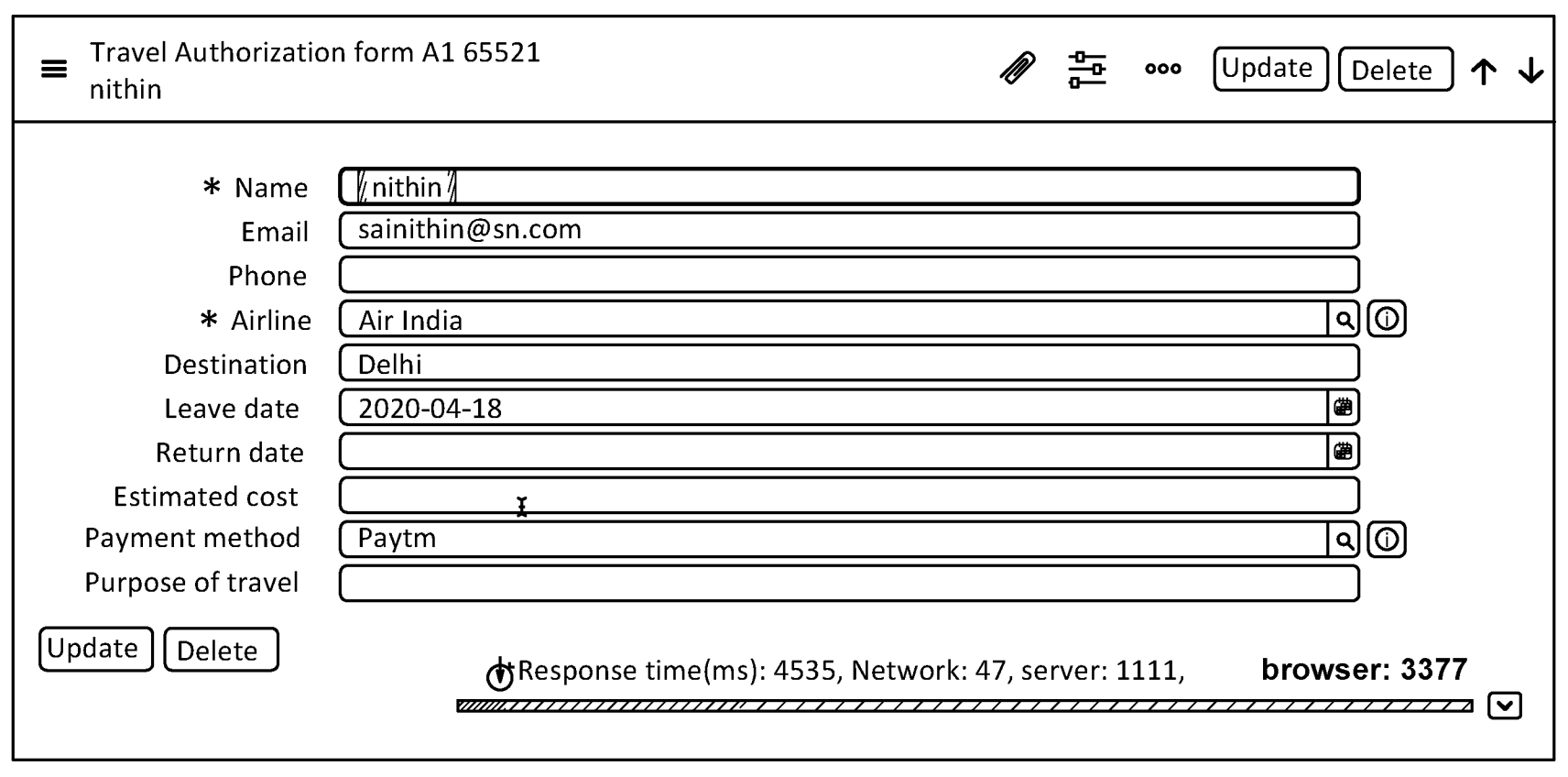

FIG. 16 is a diagram illustrating an embodiment of a user interface for an automatically generated computer form application. In some embodiments, the user interface of FIG. 16 is displayed by an automatically generated computer form application to a user for collecting user data. The computer form application allows a user to provide responses to any of the included response fields of a digital form including fields that may have been excluded by a conversation bot. For example, a conversation bot prompts a user for responses to only the selected response fields of the form that are included in the conversation bot whereas a corresponding computer form application of the form allows a user to edit and/or provide responses to any included fields of the form including non-mandatory fields and fields excluded from the conversation bot. In some embodiments, the computer form application corresponds to physical form document 1000 of FIG. 10 and/or an analyzed and validated form with corresponding response fields and text labels of FIG. 11. Utilizing the shown user interface, users can input user data based on a custom form document that is collected and stored at a persistent data storage and/or modify responses provided via a conversation bot.

In the example shown, FIG. 16 depicts a partially completed digital form. In various embodiments, the non-completed response fields may be optional fields. The completed response fields correspond to the fields included in the conversation bot configured as shown in FIG. 11 and include the responses of the conversation session shown in FIGS. 12-15. For example, responses for responses fields for Name, Email, Airline, Destination, Leave Date, and Payment Method are shown as provided by the user based on a conversation session corresponding to the one shown in and described with respect to FIGS. 12-15. Response fields not included in the conversation bot (i.e., response fields Phone, Return Date, Estimated Cost, and Purpose of Travel) are shown as blank. Using the user interface of FIG. 16, a user (or administrator) can subsequently modify the responses provided by the user via a conversation bot. In some embodiments, access to the computer form application of FIG. 16 is provided to the user via the conversation bot. For example, a link to the computer form application can be provided to the user once the response fields have been submitted.

Figure 17:
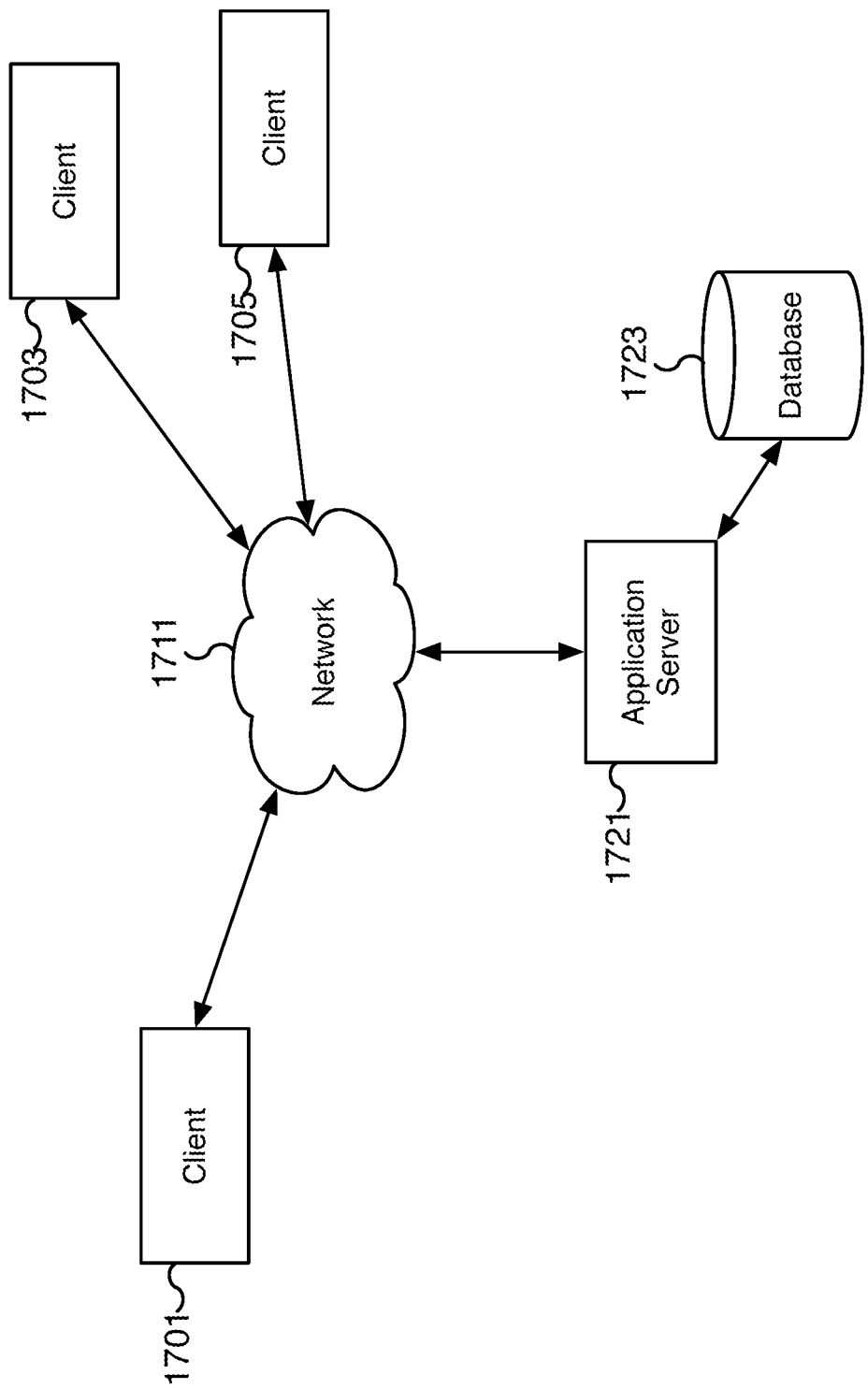
FIG. 17 is a block diagram illustrating an example of a network environment of a conversation bot for collecting user form information.

FIG. 17 is a block diagram illustrating an example of a network environment of a conversation bot for collecting user form information. In the example shown, clients 1701, 1703, and 1705 access services on application server 1721 via network 1711 including a conversation bot service. Network 1711 can be a public or private network. In some embodiments, network 1711 is a public network such as the Internet. In various embodiments, clients 1701, 1703, and 1705 are network clients such as web browsers for accessing web services. Application server 1721 provides web services including web applications such as a web-based conversation bot or virtual agent. In some embodiments, application server 1721 provides services for generating and configuring a conversation bot. In some embodiments, user form information responses are captured via a conversation bot running on one or more of clients 1701, 1703, and 1705 and application server 1721. For example, a conversation bot client component can run on clients 1701, 1703, and 1705 and a conversation bot server component can run on application server 1721. In some embodiments, the conversation bot is generated and configured using the processes of FIGS. 1-4 and the generated conversation bot is utilized to collect user form information via the process of FIG. 5 using one or more of the components of FIG. 17. In some embodiments, the user interfaces and corresponding applications of FIGS. 7-8, 9A-9B, and/or 11-16 are accessible via clients 1701, 1703, and 1705 and are at least in part hosted on application server 1721.

In various embodiments, application server 1721 can utilize database 1723 to provide certain services. For example, database 1723 can be a configuration management database (CMDB) used by application server 1721 for providing CMDB services. Among other information, database 1723 can store configuration information related to managed assets, such as related hardware and/or software configurations. In some embodiments, database 1723 is a persistent computer storage that is network accessible and used to store user responses collected via a conversation bot and/or to host a corresponding digital form accessible via the conversation bot.

In some embodiments, the network environment of FIG. 17 is used to configure and generate a conversation bot using the processes of FIGS. 1-4. For example, a digitized version of a form can be uploaded from any one of clients 1701, 1703, or 1705 to application server 1721. Using one of clients 1701, 1703, or 1705, an administrator can configure the corresponding digital form and conversation bot. In some embodiments, the generation and configuration of the conversation bot is performed at least in part by application server 1721 and any persistent configuration data can be stored in database 1723. In various embodiments, the generated conversation bot can be hosted at application server 1721 and is accessible via clients 1701, 1703, and/or 1705. For example, a user can interact with a digital form as shown in the example conversation bot conversation session of FIGS. 12-15 via one of clients 1701, 1703, or 1705. Similarly, in some embodiments, an administrator can configure and generate a conversation bot and corresponding digital form using the services of FIGS. 7-8 and/or 11 via one of clients 1701, 1703, or 1705 and a user can interact with a digital form using the applications of FIGS. 9A-9B and/or 16 via one of clients 1701, 1703, or 1705.

Although single instances of some components have been shown to simplify the diagram, additional instances of any of the components shown in FIG. 17 may exist. For example, application server 1721 may include one or more servers. Similarly, database 1723 may not be directly connected to application server 1721 and/or may be replicated or distributed across multiple components. In some embodiments, the server(s) for generating and configuring a conversation bot are different from the servers for hosting the generated server components of the conversation bot. As another example, clients 1701, 1703, and 1705 are just a few examples of potential clients to application server 1721. Fewer or more clients can connect to application server 1721. In some embodiments, components not shown in FIG. 17 may also exist.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving an input document data;
    analyzing the input document data to automatically identify one or more response fields and one or more corresponding text labels laid out in the input document data;
    for a specific response field included in the one or more response fields, searching database tables and database fields including by:
        tokenizing content of the specific response field into a set of reference tokens;
        tokenizing identifiers of the database tables into sets of candidate tokens; and
        based on a match between the set of reference tokens and one of the sets of candidate tokens, identifying a matching database table for the specific response field to identify a set of valid response options specified in the matching database table for the specific response field that enforce response compatibility across different forms; and
    automatically configuring a conversation bot to provide one or more requests to provide one or more responses corresponding to the one or more response fields, receive the one or more responses including a response to the specific response field and store the one or more responses in a persistent computer storage, wherein the conversation bot is configured to enforce validation of the response to the specific response field using the identified set of valid response options.

2. The method of claim 1, wherein the matching database table is identified based a partial match between a first keyword in the set of reference tokens and a second keyword in the one of the sets of candidate tokens.

3. The method of claim 1, further comprising determining a data type for each of the one or more automatically identified response fields.

4. The method of claim 3, wherein one of the automatically identified one or more response fields references an existing data store.

5. The method of claim 1, further comprising:
    receiving one or more trigger phrases for the input document data.

6. The method of claim 5, further comprising:
    initiating the configured conversation bot;
    identifying a match to one of the one or more trigger phrases for the input document data;
    in response to an identified match, providing the one or more requests to a user of the conversation bot;
    receiving the one or more responses from the user; and
    storing the one or more responses in the persistent computer storage.

7. The method of claim 6, further comprising:
    providing a summary of the received one or more responses.

8. The method of claim 6, further comprising:
    providing a confirmation request to submit the received one or more responses as a finalized submission; and
    receiving a user confirmation in advance of the storing of the one or more responses in the persistent computer storage.

9. The method of claim 6,
    providing a user selection dialog associated with one of the one or more requests based on a data type of a response associated with the one of the one or more requests.

10. The method of claim 9, wherein the data type of the response is a reference data type and the user selection dialog includes one or more valid values for the reference data type.

11. The method of claim 9, wherein the data type of the response is a date data type and the user selection dialog is a date selection dialog.

12. The method of claim 11, wherein a valid range of dates of the date selection dialog is limited based on a date configuration setting.

13. The method of claim 12, wherein the date configuration setting is based on a previous response to a previous request.

14. The method of claim 1, wherein the input document data is a digitized version of an annotated form document, and wherein one or more annotations of the annotated form document specify configuration settings associated with the one or more response fields.

15. The method of claim 1, wherein the analyzing of the input document data includes identifying one or more response annotations corresponding to the one or more response fields.

16. The method of claim 15, wherein one of the one or more response annotations identifies a data type of a corresponding one of the one or more response fields.

17. The method of claim 15, wherein one of the one or more response annotations specifies a configuration setting of a corresponding one of the one or more response fields.

18. The method of claim 17, wherein the configuration setting is a mandatory field setting of the corresponding one of the one or more response fields.

19. A system, comprising:
    one or more processors; and
    a memory coupled to the one or more processors, wherein the memory is configured to provide the one or more processors with instructions which when executed cause the one or more processors to:
        receive an input document data;
        analyze the input document data to automatically identify one or more response fields and one or more corresponding text labels laid out in the input document data;
        for a specific response field included in the one or more response fields, search database tables and database fields including by:
            tokenize content of the specific response field into a set of reference tokens;
            tokenize identifiers of the database tables into sets of candidate tokens; and
            based on a match between the set of reference tokens and one of the sets of candidate tokens, identify a matching database table for the specific response field to identify a set of valid response options specified in the matching database table for the specific response field that enforce response compatibility across different forms; and automatically configure a conversation bot to provide one or more requests to provide one or more responses corresponding to the one or more response fields, receive the one or more responses including a response to the specific response field and store the one or more responses in a persistent computer storage, wherein the conversation bot is configured to enforce validation of the response to the specific response field using the identified set of valid response options.

20. A computer program product comprising a non-transitory computer readable storage medium having computer instructions that, upon execution by a computer, causes the computer to perform:

receiving an input document data;

analyzing the input document data to automatically identify one or more response fields and one or more corresponding text labels laid out in the input document data;

for a specific response field included in the one or more response fields, searching database tables and database fields including by:
  tokenizing content of the specific response field into a set of reference tokens;
  tokenizing identifiers of the database tables into sets of candidate tokens; and
  based on a match between the set of reference tokens and one of the sets of candidate tokens, identifying a matching database table for the specific response field to identify a set of valid response options specified in the matching database table for the specific response field that enforce response compatibility across different forms; and automatically configuring a conversation bot to provide one or more requests to provide one or more responses corresponding to the one or more response fields, receive the one or more responses including a response to the specific response field, and store the one or more responses in a persistent computer storage, wherein the conversation bot is configured to enforce validation of the response to the specific response field using the identified set of valid response options.

* * * * *